(12) United States Patent
Barbaiani et al.

(10) Patent No.: US 9,020,804 B2
(45) Date of Patent: Apr. 28, 2015

(54) METHOD FOR ALIGNING SENTENCES AT THE WORD LEVEL ENFORCING SELECTIVE CONTIGUITY CONSTRAINTS

(75) Inventors: Madalina Barbaiani, Bucharest (RO);
Nicola Cancedda, Grenoble (FR);
Christopher R. Dance, Grenoble (FR);
Szilárd Zsolt Fazekas, Tarragona (ES);
Tamás Gaál, Grenoble (FR); Eric Gaussier, Eybens (FR)

(73) Assignee: Xerox Corporation, Norwalk, CT (US)

(*) Notice: Subject to any disclaimer, the term of this patent is extended or adjusted under 35 U.S.C. 154(b) by 2365 days.

(21) Appl. No.: 11/756,684

(22) Filed: Jun. 1, 2007

(65) Prior Publication Data

US 2008/0300857 A1  Dec. 4, 2008

(51) Int. Cl.
*G06F 17/28* (2006.01)

(52) U.S. Cl.
CPC .................................. *G06F 17/2827* (2013.01)

(58) Field of Classification Search
USPC ........................................................ 704/1–10
See application file for complete search history.

(56) References Cited

U.S. PATENT DOCUMENTS

| | | | |
|---|---|---|---|
| 5,357,430 A * | 10/1994 | Rackow et al. .................... 704/2 |
| 5,477,451 A | 12/1995 | Brown et al. |
| 5,510,981 A * | 4/1996 | Berger et al. ...................... 704/2 |
| 5,991,710 A | 11/1999 | Papineni et al. |
| 6,073,098 A * | 6/2000 | Buchsbaum et al. .......... 704/255 |
| 6,182,026 B1 * | 1/2001 | Tillmann et al. .................. 704/2 |
| 6,236,958 B1 | 5/2001 | Lange et al. |
| 6,304,841 B1 | 10/2001 | Berger et al. |
| 6,542,866 B1 | 4/2003 | Jiang et al. |
| 6,678,415 B1 | 1/2004 | Popat et al. |
| 6,848,080 B1 | 1/2005 | Lee et al. |
| 6,885,985 B2 | 4/2005 | Hull |
| 7,191,115 B2 | 3/2007 | Moore |
| 7,353,165 B2 | 4/2008 | Zhou et al. |
| 2002/0188439 A1 * | 12/2002 | Marcu ................................ 704/5 |
| 2003/0018470 A1 * | 1/2003 | Golden et al. .................. 704/10 |
| 2004/0024581 A1 | 2/2004 | Koehn et al. |
| 2004/0030551 A1 | 2/2004 | Marcu et al. |
| 2004/0098247 A1 * | 5/2004 | Moore ............................... 704/4 |
| 2004/0122656 A1 * | 6/2004 | Abir ................................... 704/4 |

(Continued)

OTHER PUBLICATIONS

David Yarowsky et al., "Inducing Multilingual POS Taggers and NP Bracketers via Robust Projection across Aligned Corpora", 2001, John Hopkins University, p. 1-8.*

(Continued)

*Primary Examiner* — Richemond Dorvil
*Assistant Examiner* — Mark Villena
(74) *Attorney, Agent, or Firm* — Fay Sharpe LLP

(57) ABSTRACT

An alignment method includes, for a source sentence in a source language, identifying whether the sentence includes at least one candidate term comprising a contiguous subsequence of words of the source sentence. A target sentence in a target language is aligned with the source sentence. This includes developing a probabilistic model which models conditional probability distributions for alignments between words of the source sentence and words of the target sentence and generating an optimal alignment based on the probabilistic model, including, where the source sentence includes the at least one candidate term, enforcing a contiguity constraint which requires that all the words of the target sentence which are aligned with an identified candidate term form a contiguous subsequence of the target sentence.

24 Claims, 10 Drawing Sheets

(56) References Cited

U.S. PATENT DOCUMENTS

| | | | |
|---|---|---|---|
| 2005/0108000 A1 | 5/2005 | Kempe et al. | |
| 2005/0216264 A1* | 9/2005 | Attwater et al. | 704/239 |
| 2005/0228643 A1 | 10/2005 | Munteanu et al. | |
| 2006/0009963 A1 | 1/2006 | Gaussier et al. | |
| 2006/0095248 A1* | 5/2006 | Menezes et al. | 704/3 |
| 2007/0033001 A1 | 2/2007 | Muslea et al. | |
| 2007/0239423 A1* | 10/2007 | Miller | 704/2 |
| 2008/0162111 A1* | 7/2008 | Bangalore et al. | 704/2 |

OTHER PUBLICATIONS

Brown, Example-Based Machine Translation in the Pangloss System, In Proc. of the 16th Intl. Conf. on Computational Linguistics (COLING-96), pp. 169-174, Denmark, Aug. 5-9, 1996.

http://en.wikipedia.org/wiki/Poisson_distribution, downloaded Mar. 22, 2006.

M. Carl, A. Way, "Workshop on Example-Based Machine Translation", MT-SUMMIT VIII, Santiago de Compostela, Spain, Sep. 18-22, 2001.

M. Simard, et al., Translating with Non-Continuous Phrases, (English Translation of Traduction Automatique Statistique Avec Des Segments Discontinues) 12th Annual Conference on the Automatic Treatment of Natural Language (TALN), pp. 233-242, Dourdan, France, (Jun. 2005).

P.F.Brown, S.A.D.Pietra, V.J.D.Pietra, R.L.Mercer, The Mathematics of Statistical Machine Translation: Parameter Estimation, Computational Linguistics, 19(2):263-311, 1993.

P.Koehn, PHARAOH: A Beam Search Decoder for Phrase-Based Statistical Machine Translations Models, USC Information Science Institute, Dec. 2003.

F.J.Och, H.Ney, A Systematic Comparison of Various Statistical Alignment Models, Computational Linguistics, 29(1):19-51, Mar. 2003.

F.J.Och, H.Ney, The Alignment Template Approach to Statistical Machine Translation, Computational Linguistics, 30(4):417-449, 2004.

C.Tillmann, F.Xia, A Phrase-Based Unigram Model for Statistical Machine Translation, Proc. of the HLT-NAACL 2003 Conference, Edmonton, Canada, 2003.

N.Ueffing, F.J.Och, H.Ney, Generation of Word Graphs in Statistical Machine Translation, Proc. of the 7th Conference on the Empirical Methods in Natural Language Processing (EMNLP), pp. 156-163, Philadelphia, 2002.

R.Zens, H.Ney, Improvements in Phrase-Based Statistical Machine Translation, Proc. of the Human Language Technology Conference (HTL-NAACL), 2004.

C.Chenon, Vers une meilleure utilisabilite des memoires de traduction fondee sur un alignement sous-phrastique. These de Doctorat, Universite Joseph Fourier, Oct. 2005 (Abstract).

D.Chiang, A Hierarchical Phrase-Based Model For Statistical Machine Translation, Proc. 43rd Meeting of the Assn. for Computational Linguistics (ACL), Ann Harbor, Michigan, Jun. 2005.

B.Efron, C.Morris, Stein's Paradox In Statistics, Scientific American, 236, 119-127, 1977.

U.S. Appl. No. 11/315,043, filed Dec. 22, 2005, Cancedda, et al.
U.S. Appl. No. 11/431,393, filed May 10, 2006, Cancedda, et al.
U.S. Appl. No. 11/789,089, filed Apr. 20, 2007, Pacull.

A.Crabtree, J.O'Neill, P.Tolmie, S.Castellani, T. Colombino, A.Grasso, The Practical Indispensability of Articulation Work to Immediate and Remote Help-Giving, Proceedings of the 2006 ACM Conference on Computer Supported Cooperative Work, Banff: ACM Press, 2006.

A.Kempe, Acronym-Meaning Extraction from Corpora Using Multitape Weighted Finite-State Machines, Xerox Corporation, Research Report 2006/019, Jul. 26, 2006.

A.Kempe, J.M.Chaparnaud, J.Eisner, F.Guingne, F.Nicart, A Class of Rational n-WFSM Auto-Intersections, In FSMNLP, Helsinki, Finland, 2005.

A.Kempe, J.M.Champarnaud, J.Eisner, A Note on Join and Auto-Intersection of n-ary Rational Relations, In B. Watson and L. Cleophas, editors, Proceedings Eindhoven FASTAR Days, No. 04-40 in TU/e CS TR, pp. 64-78, Eindhoven, Netherlands, 2004.

P.Koehn, F.J.Och, D.Marcu, Statistical Phrase-Based Translation, In Proceedings of HLT-NAACL, Edmonton, Canada, 2003.

S.Kumar, W.Byrne, A Weighted Finite State Transducer Implementation of the Alignment Template Model for Statistical Machine Translation, In HLT-NAACL 2003, Main Papers, pp. 63-70, Edmonton, Canada, May-Jun. 2003.

R.C.Moore, A Discriminative Framework for Bilingual Word Alignment, Proceedings of HLT/EMNLP, pp. 81-88, Vancouver, BC, Canada, Oct. 2005.

F.J.Och, C.Tillman, H.Ney, Improved Alignment Models for Statistical Machine Translation, In Proceedings of EMNLP/VLC 1999, pp. 20-28, University of Maryland, College Park, MD, 1999.

C.Goutte, K.Yamada, E.Gaussier, Aligning Words Using Matrix Factorisation, In Proceedings of ACL'04, Barcelona, Spain, 2004.

S.Vogel, H.Ney, C.Tillmann, HMM-Based Word Alignment in Statistical Translation, In COLING 96, Copenhagen, 1996.

E.Gaussier, Flow Network Models for Word Alignment and Terminology Extraction from Bilingual Corpora, In Proceedings of the 36th Annual Meeting of the Association for Computational Linguistics and 17th Intl Conference on Computational Linguistics, pp. 444-450, San Francisco, CA, 1998.

A.P.Dempster, N.M.Laird, D.B.Rubin, Maximum Likelihood from Incomplete Data Using the EM Algorithm, Journal of the Royal Statistical Society, Series B (Methodological), vol. 39, No. 1, pp. 1-38, 1977.

N.Aswani, R.Gaizauskas, A Hybrid Approach to Align Sentences and Words in English-Hindi Parallel Corpora, In ACL Workshop on Building and Using Parallel Text, 2005.

M.Simard, P.Plamondon, Bilingual Sentence Alignment: Balancing Robustness and Accuracy, Machine Translation, vol. 13, No. 11, Mar. 1998.

D.Yarowsky, G.Ngai, R.Wicentowski, Inducing Multilingual Text Analysis Tools Via Robust Projection Across Aligned Corpora, In Proceedings of HLT, San Diego, CA, 2001.

A.Kempe, F.Guingne, F.Nicart, Algorithms for Weighted Multi-Tape Automata, Xerox Corporation, Research Report 2004/031, Meylan, France, 2004.

I.Dagan, K.Church, Termight: Coordinating Man and Machine in Bilingual Terminology Acquisition, Journal Tex, Jul. 24, 1996.

J.Martin, R.Mihalcea, T.Pedersen, Word Alignment for Languages with Scarce Resources, In Proceedings of ACL Workshop on Building and Using Parallel Text, Ann Arbor, MI, 2005.

H.Dejean, E.Gaussier, J.M.Renders, F.Sadat, Automatic Processing of Multilingual Medical Terminology: Applications to Thesaurus Enrichment and Cross-Language Information Retrieval, Artificial Intelligence in Medicine, vol. 33, No. 2, pp. 111-124, 2005.

H.Dejean, F.Sadat, E.Gaussier, Bilingual Lexicon Extraction: Using and Enriching Multilingual Thesauri, Proceedings of Terminology Knowledge Extraction, Nancy, France, Aug. 2002.

S.Kumar, W.Byrne, A Weighted Finite State Transducer Translation Template Model for Statistical Machine Translation, CLSP Research Note No. 48, John Hopkins University, Aug. 29, 2004.

F.J.Och, H.Ney, A Comparison of Alignment Models for Statistical Machine Translation, In Proceedings of the 18th International Conference on Computational Linguistics, vol. 2, pp. 1086-1090, Morristown, NJ, 2000.

* cited by examiner

FIG. 10
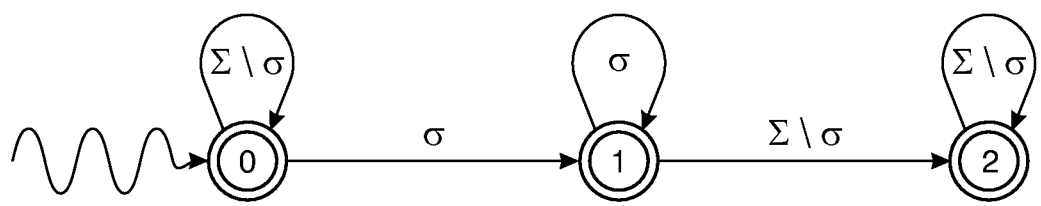
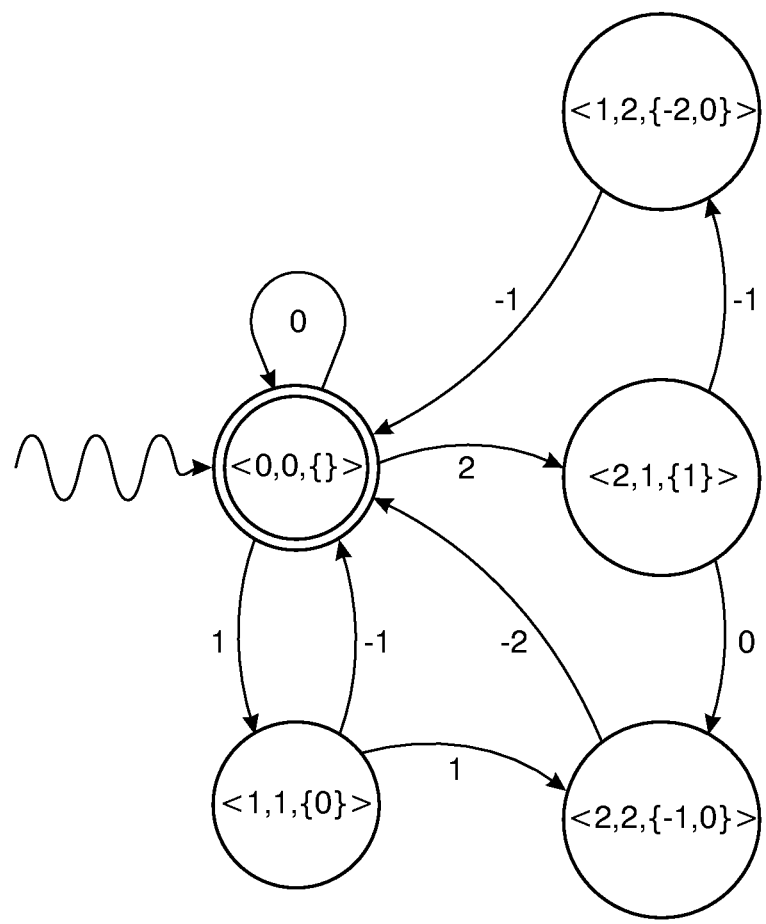
FIG. 11

METHOD FOR ALIGNING SENTENCES AT THE WORD LEVEL ENFORCING SELECTIVE CONTIGUITY CONSTRAINTS

CROSS REFERENCE TO RELATED PATENTS AND APPLICATIONS

The following copending applications, the disclosures of which are incorporated herein by reference in their entireties, are mentioned:

application Ser. No. 11/789,089, filed Apr. 20, 2007, entitled METHOD FOR BUILDING PARALLEL CORPORA, by Francois Pacull (hereinafter "Pacull").

application Ser. No. 11/431,393, filed May 10, 2006, entitled MACHINE TRANSLATION USING ELASTIC CHUNKS, by Nicola Cancedda, et al.

BACKGROUND

The exemplary embodiment relates to the extraction of bilingual terminology from parallel corpora for a translation tool. It finds particular application as a method for aligning parallel corpora for use in cross-language text retrieval, semi-automatic bilingual thesaurus enhancement, and statistical machine translation systems.

Specialized bilingual terminologies are invaluable to technical translators for ensuring correctness and consistency in large translation projects. Usually terminologies are built by specialized professionals (terminologists) and by the translators themselves, through a manually-intensive process. Tools for automating, partially or completely, such a process would thus be very useful. Several methods for extracting multilingual terminologies from parallel document collections have been proposed.

Parallel text discovery systems have been developed for identifying pairs of sentences or text fragments which are translations of one another starting from collections of parallel or comparable documents. Parallel documents are those which are intended to be mutual, complete translations of each other. Comparable documents are documents which, while not being complete translations, have considerable overlap in their content.

Once the documents have been identified, the documents are aligned, first on a paragraph or section level and then at the sentence level. Automated systems have been developed for performing the alignment. Alignment of subsequences of words within the aligned sentences has proved more difficult since phrases which are formed from a contiguous subsequence of words in one language may be non-contiguous in the other. For example, noun phrases (phrases which include one or more words grouped around a noun) are typically contiguous in English, while prepositional verbs can form discontinuous subsequences.

Probabilistic models, such as Hidden Markov Models (HMMs), have been developed for modeling systems in which some variables are hidden, but which are assumed to be statistically related to observed variables. The HMM makes certain assumptions, including that the values of the hidden variables (states) depend only upon previous values of the hidden variables, that the value of each hidden variable is independent of the values of the other hidden variables, and that the values of the observed variables depend only on the current values of the hidden variables. HMMs have been used to model alignment of sentences at the word level.

Finite state models have been applied to many aspects of language processing, including parsing and machine translation. Finite-state models are attractive mechanisms for language processing since they provide an efficient data structure for representing weighted ambiguous hypotheses. They facilitate the composition of models which allow for straightforward integration of constraints.

INCORPORATION BY REFERENCE

The following references, the disclosures of which are incorporated herein by reference in their entireties, are mentioned:

U.S. Pat. No. 6,885,985, issued Apr. 26, 2005, entitled TERMINOLOGY TRANSLATION FOR UNALIGNED COMPARABLE CORPORA USING CATEGORY BASED TRANSLATION PROBABILITIES, by David Hull, discloses a method and apparatus for generating translations of natural language terms from a first language to a second language. A plurality of terms is extracted from unaligned comparable corpora of the first and second languages. Comparable corpora are sets of documents in different languages that come from the same domain and have similar genre and content. Unaligned documents are not translations of one another and are not linked in any other way. By accessing monolingual thesauri of the first and second languages, a category is assigned to each extracted term. Then, category-to-category translation probabilities are estimated, and using these translation probabilities, term-to-term translation probabilities are estimated.

U.S. Pat. No. 6,236,958, issued May 22, 2001, entitled METHOD AND SYSTEM FOR EXTRACTING PAIRS OF MULTILINGUAL TERMINOLOGY FROM AN ALIGNED MULTILINGUAL TEXT, by Lange, et al., discloses a terminology extraction system which allows for automatic creation of bilingual terminology has a source text which comprises at least one sequence of source terms, aligned with a target text which also comprises at least one sequence of target terms. A term extractor builds a network from each source and target sequence wherein each node of the network comprises at least one term and such that each combination of source terms is included within one source node and each combination of target terms is included within one target node. The term extractor links each source node with each target node, and through a flow optimization method, selects relevant links in the resulting network. Once the term extractor has been run on the entire set of aligned sequences, a term statistics circuit computes an association score for each pair of linked source/target terms, and finally the scored pairs of linked source/target term that are considered relevant bilingual terms are stored in a bilingual terminology database.

U.S. Pub. No. 2007/0033001, published Feb. 8, 2007, entitled IDENTIFYING DOCUMENTS WHICH FORM TRANSLATED PAIRS, WITHIN A DOCUMENT COLLECTION, by Muslea, et al. discloses a training system for text to text application The training system finds groups of documents, and identifies automatically similar documents in the groups which are similar. The automatically identified documents can then be used for training of the text to text application. The comparison uses reduced size versions of the documents in order to minimize the amount of processing. The system forms a similarity measure that returns a score given a document pair.

U.S. Pat. No. 7,191,115, issued Mar. 13, 2007, entitled STATISTICAL METHOD AND APPARATUS FOR LEARNING TRANSLATION RELATIONSHIPS AMONG WORDS, by Moore, discloses a method in which a parallel bilingual training corpus is parsed into its content words. Word association scores for each pair of content words consisting of a word of a first language that occurs in a sentence aligned in the bilingual corpus to a sentence of a second language in which the other word occurs. A pair of words is considered "linked" in a pair of aligned sentences if one of the words is the most highly associated, of all the words in its sentence, with the other word. The occurrence of compounds is hypothesized in the training data by identifying maximal, connected sets of linked words in each pair of aligned sentences in the processed and scored training data. Whenever one of these maximal, connected sets contains more than one word in either or both of the languages, the subset of the words in that language is hypothesized as a compound.

U.S. Published Application No. 2005/0228643, published Oct. 13, 2005, entitled DISCOVERY OF PARALLEL TEXT PORTIONS IN COMPARABLE COLLECTIONS OF CORPORA AND TRAINING USING COMPARABLE TEXTS, by Munteanu, et al., discloses a translation training device which extracts a set of parallel sentences from two nonparallel corpora. The system finds parallel sentences. The parallel sentences are then used for training a data-driven machine translation system. The process can be applied repetitively until sufficient data is collected or until the performance of the translation system stops improving.

U.S. Published Application No. 2006/0009963, published Jan. 12, 2006, entitled METHOD AND APPARATUS FOR IDENTIFYING BILINGUAL LEXICONS IN COMPARABLE CORPORA, by Gaussier, et al., discloses methods formulated using a geometric interpretation for identifying bilingual pairs in comparable corpora using a bilingual dictionary. The methods may be used separately or in combination to compute the similarity between bilingual pairs.

U.S. Published Application No. 2005/0108000, published May 19, 2005, entitled METHOD AND APPARATUS FOR PROCESSING NATURAL LANGUAGE USING TAPE-INTERSECTION, by Kempe, et al., describes operations for weighted and non-weighted multi-tape automata for use in natural language processing tasks such as morphological analysis, disambiguation, and entity extraction.

Methods for extracting bilingual lexicons from parallel or comparable corpora are described, for example, in the following publications: Philip Resnik, Noah A. Smith, "The Web as a Parallel Corpus," in Computational Linguistics 29 (3), pp. 349-380, September 2003 (Hereinafter "Resnik, et al."); Xiaoyi Ma and Mark Liberman, "Bits: A Method for Bilingual Text Search Over the Web, in Machine Translation Summit VII, September 1999 (Hereinafter "Ma, et al."); Dragos Munteanu and Daniel Marcu, "Improving Machine Translation Performance by Exploiting Comparable Corpora," in Computational Linguistics, 31 (4), pp. 477-504, December 2005; Rapp, "Identifying Word Translations In Nonparallel Texts," in Proceedings of the Annual Meeting of the Association for Computational Linguistics, 1995; Peters, et al., "Capturing The Comparable: A System For Querying Comparable Text Corpora," in JADT '95-3rd International Conference on Statistical Analysis of Textual Data, pages 255-262, 1995; Tanaka et al., "Extraction Of Lexical Translations From Non-Aligned Corpora," in International Conference on Computational Linguistics, COLING '96, 1996; Shahzad, et al., "Identifying Translations Of Compound Nouns Using Non-Aligned Corpora," in Proceedings of the Workshop MAL '99, pp. 108-113, 1999; Fung, et al., "A Statistical View On Bilingual Lexicon Extraction—From Parallel Corpora To Nonparallel Corpora," in J. Veronis, editor, Parallel Text Processing, Kluwer Academic Publishers, 2000; and Tomás, et al., "Web-Mining: An Unsupervised Parallel Corpora Web Retrieval System," Corpus Linguistics 2005 Conf.

The following references discuss alignment at the word or phrase level in parallel corpora: Peter F. Brown, Vincent J. Della Pietra, Stephen A. Della Pietra, and Robert L. Mercer, "The Mathematics of Statistical Machine Translation: Parameter Estimation," Comput. Linguist., 19(2):263-311 (1993); Stephan Vogel, Hermann Ney, and Cristoph Tillmann, "HMM-based Word Alignment in Statistical Translation," in COLING 96, Copenhagen (1996); Robert Moore, "A Discriminative Framework for Bilingual Word Alignment," in Proc. of HLT/EMNLP 2005, Vancouver, BC, Canada, (2005); Franz Och, Christophe Tillmann, and Hermann Ney, "Improved Alignment Models for Statistical Machine Translation," in Proc. of EMNLP/VLC 1999, University of Maryland, College Park, Md., USA (1999); Philipp Koehn, Franz Och, and Daniel Marcu. Statistical phrase-based translation. In Proc. of HLT-NAACL 2003, Edmonton, Canada, 2003; Shankar Kumar and William Byrne, "A Weighted Finite State Transducer Implementation of the Alignment Template Model for Statistical Machine Translation," in HLT-NAACL 2003, Edmonton, Canada (2003); Eric Gaussier, "Flow Network Models for Word Alignment and Terminology Extraction from Bilingual Corpora," in Christian Boitet and Pete Whitelock, Eds, Proc. of the Thirty-Sixth Annual Meeting of the Association for Computational Linguistics and Seventeenth International Conference on Computational Linguistics, pages 444-450, San Francisco, Calif. (Morgan Kaufmann Publishers 1998) This last reference discloses the use of a greedy heuristic which results in contiguity without considering whether the alignment is optimal.

BRIEF DESCRIPTION

In accordance with one aspect of the exemplary embodiment, an alignment method includes, for a source sentence in a source language, identifying whether the sentence includes at least one candidate term comprising a contiguous subsequence of words of the source sentence. A target sentence in a target language is aligned with the source sentence, including, developing a probabilistic model which models conditional probability distributions for alignments between words of the source sentence and words of the target sentence, and generating an optimal alignment based on the probabilistic model, including, where the source sentence includes the at least one candidate term, enforcing a contiguity constraint which requires that all the words of the target sentence which are aligned with an identified candidate term form a contiguous subsequence of the target sentence.

In accordance with another aspect, a system includes a sentence aligner which aligns sentences of a target document in a target language with respective sentences of a source document in a source language. A source term tagger tags terms of each source sentence which meet criteria for at least one class of candidate terms, each of the candidate terms comprising a contiguous subsequence of words of the source sentence. A word aligner generates, for a pair of sentences aligned by the sentence aligner, an alignment between the words of a target sentence and the words of the source sentence. The word aligner develops a probabilistic model which models conditional probability distributions for alignments between words of the source sentence and words of the target sentence and generates an optimal alignment based on the probabilistic model. The word aligner enforces a contiguity constraint which requires that all the words of the target sentence which are aligned with one of the candidate terms identified by the term tagger form a contiguous subsequence of the target sentence.

In accordance with another aspect, a method of generating a terminological lexicon includes providing a parallel corpus, the corpus comprising source sentences in a source language and target sentences in target language. The method includes providing for the identifying of noun phrases in the source sentences but not in the target sentences and, for each of plurality of source sentences, generating an alignment in which words of a respective target sentence are aligned with words of the source sentence, whereby words of the target sentence which are aligned with a selected noun phrase are identified. In generating the alignment, a contiguity constraint is enforced which requires that all the words of the target sentence which are aligned with the selected noun phrase form a contiguous subsequence of words of the target sentence. Optionally, where a plurality of contiguous subsequences of aligned target sentences are aligned with a common noun phrase, the method includes filtering the contiguous subsequences to remove contiguous subsequences which are less probable translations of the noun phrase. The method further includes incorporating the noun phrase together with at least one identified contiguous sequence which has been aligned with the noun phrase in a terminological lexicon.

BRIEF DESCRIPTION OF THE DRAWINGS

FIG. 10 illustrates an exemplary three-state automaton enforcing the constraint that whenever the state (a in the HMM-derived WFST is left, it is never entered again;

FIG. 11 illustrates an exemplary automaton that is produced by Algorithm 3 when parameters are given values $m_j=2$ and $m_w=3$.

DETAILED DESCRIPTION

Figure 1:
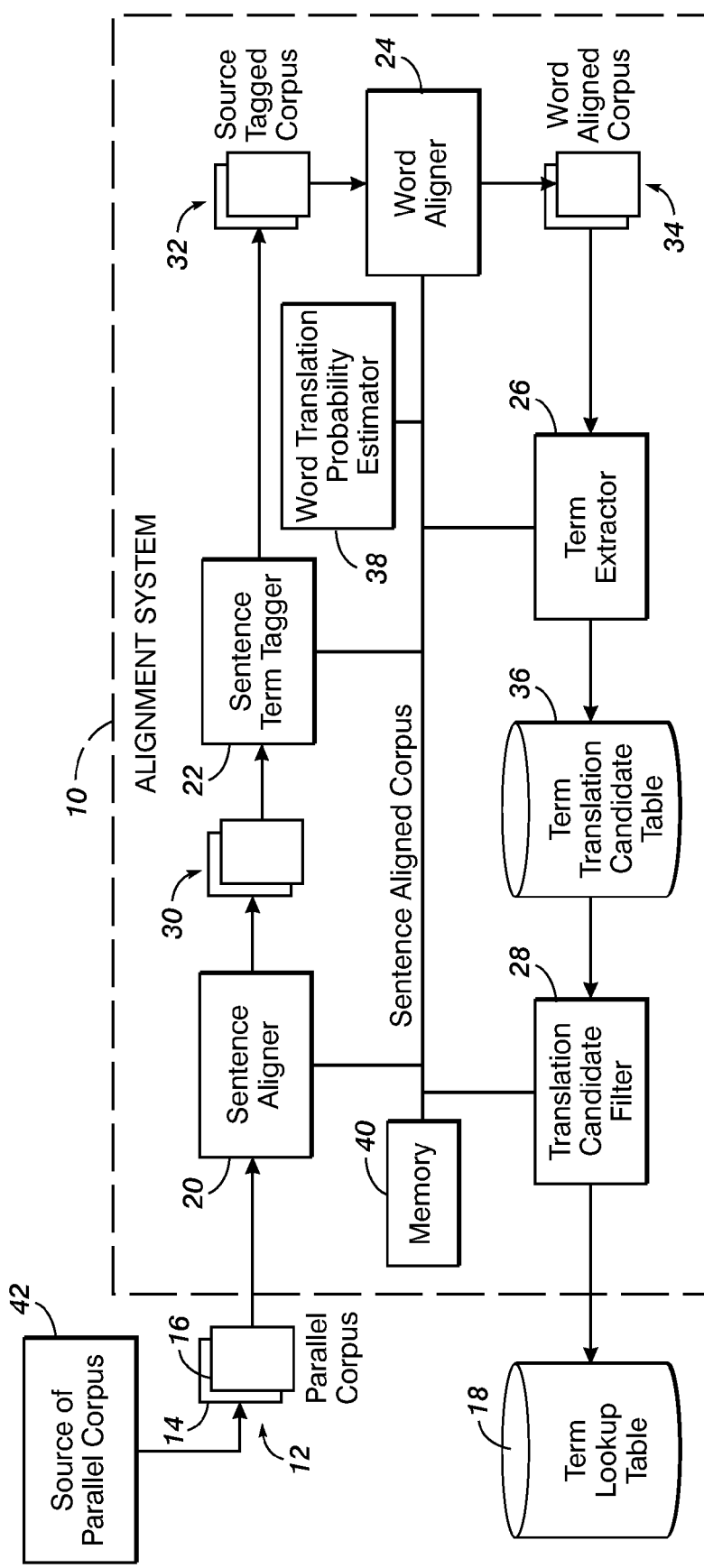
FIG. 1 is a functional block diagram of an alignment system in accordance with one aspect of the exemplary embodiment.

Aspects of the exemplary embodiment relate to a method and apparatus for aligning sentences in a parallel corpus at the word level, thereby ensuring that words in a target language sentence that are aligned with a specified contiguous subsequence of words in a source language sentence are also contiguous. The exemplary method finds direct application in the extraction of a bilingual terminological lexicon (BTL) from a parallel corpus, which may be employed by a machine translation tool, but is not limited thereto. It may also be used, for example, as a preliminary step for the extraction of phrase pairs in a phrase-based statistical machine translation system. It is particularly suited to applications in which basic linguistic resources (morphological analyzer, part-of-speech taggers, term extractors, and the like) are available for the source language but not for the target language.

In one aspect, the method of performing word alignment within sentence pairs is based on a probabilistic model, such as a Hidden Markov Model (HMM) and its transformation into a Weighted Finite State Transducer (WFST). This compilation makes it convenient to enforce contiguity constraints. In various aspects, the probabilistic model explicitly models distortion in alignments, and the composition with a specially-designed finite-state automaton enforcing the contiguity constraint ensures that the produced alignment is the optimal alignment respecting the contiguity constraint according to the probabilistic model itself.

Unlike previously proposed methods, the method can be used to extract bilingual terminologies in cases when neither a morphological analyzer nor a POS (Part of Speech) tagger is available for the target language.

The exemplary method allows the enforcement of a constraint that target words aligned to a same source term should be contiguous (contiguity constraint), thus restricting the alignment search space, and leading to improved lexica. This may be achieved without imposing the requirement that alignments be monotonic, i.e. that word order is fully preserved in the two languages.

By "contiguous," it is meant that the target words which are aligned with the words of the source term form a sequence which is not spaced by any target words that are not aligned to the source term. However, the contiguity constraint, in general, does not require that the target words aligned with the source term are in the same order as in the source term. For example, consider the English sentence, "the chemistry professor was in the laboratory," which to be aligned at the word level with the French sentence, "le professeur de chimie était dans le laboratoire." The words "professeur de chimie" satisfy the contiguity constraint for a word alignment with the source term "chemistry professor." However, an alignment of only the words "professeur" and "chemie" with "chemistry professor" would not satisfy the contiguity constraint since they are spaced, in the target sentence, by the word "de" which is not aligned with the source term in the source sentence.

As used herein, a "subsequence" may be any combination of natural language symbols that may, for example, specify a word or a term, e.g., a phrase, or other multi-word portion of a sentence, or any combination or portion thereof which constitutes less than an entire sentence. On the source side, terms may be classified according to the part of speech to which they correspond. In particular, a Noun Phrase (NP) can comprise a noun together with one or more words grouped with it, which together could form a subject of a sentence. Candidate terms are those terms tagged with a predetermined class (e.g., Noun Phrase) for which a contiguity constraint is to be enforced.

A "bilingual terminological lexicon" (BTL) is a data structure, such as a lookup table, search tree, or abstract dictionary, which provides, for each of a set of terms in the target language, a single translation in the source language.

A "parallel corpus" generally comprises one or more pairs of text documents, each pair comprising a document in a first (source) language and a document in a second (target) language which have been determined to be close translations of each other. The source and target languages can be any natural language, such as German, French, English, etc. The documents forming the parallel corpus may include electronic documents in any form, such as web documents, newsfeeds, scanned documents, and machine readable information of any kind and from any source. While particular reference is made to source and target languages, it is to be appreciated that the bilingual terminological lexicon developed in the exemplary method may be used for translations in either direction, i.e., from the source to the target language or vice versa.

Various automated methods may be employed for generating parallel corpora. Two techniques, known as STRAND (Structural Translation Recognition for Acquiring Natural Data) and BITS (Bilingual Internet Text Search) have been used to find multilingual sites on the Web which offer the same content in different languages. These techniques typically search for URLs which are similar except for information relating to the language or country. In another approach, parallel documents may be identified by searching for documents which comprise a threshold number of terms which match (i.e., terms which are accepted translations of each other), as described, for example, in Pacull, incorporated by reference. In other methods, the parallel corpus may be identified at least partially manually, e.g., by a translator. The exemplary method assumes the preexistence of a parallel corpus, irrespective of how it is generated.

With reference to FIG. 1, an environment in which an exemplary alignment system 10 for identifying terms for inclusion in a terminological lexicon operates, is shown. The system 10 may be embodied in a host processor or distributed over a number of processors and may be in the form of hardware or software or a combination thereof. The system receives as input a parallel corpus 12 which includes data comprising at least one pair of documents 14, 16 (portions of text) in source and target languages, respectively, which have been determined to be translations of each other. Some preprocessing of the documents 14, 16 may have been performed prior to their input to the system 10, such as a crude alignment of the documents on a paragraph or section level.

Figure 2:
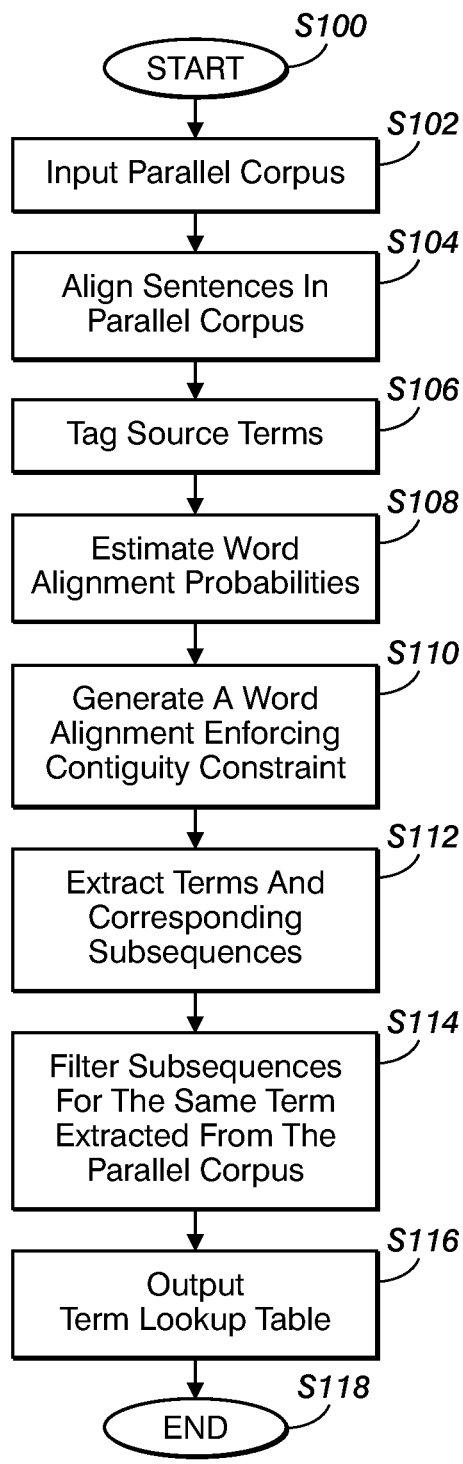
FIG. 2 is a flow diagram of an exemplary method for aligning source and target sentences and extracting aligned subsequences therefrom.

The illustrated system 10 includes a number of processing components which are utilized in performing the exemplary method and whose functions are therefore best understood with reference to the method described herein and illustrated in FIG. 2. Only a brief description of the processing components is therefore provided at this stage. The input to the exemplary system 10 is a parallel corpus. The output is a BTL 18 which provides, for each of a set of terms in the target language, a single translation in the source language.

The illustrated system 10 includes a sentence aligner 20, a source term tagger 22, a word aligner 24, a term extractor 26, and a translation candidate filter 28. The sentence aligner 20 takes as input the parallel corpus 12 and outputs an alignment 30 of the documents 14, 16 at the sentence level. The source term tagger 22 tags terms of the source document 14 with morphological tags corresponding to parts of speech and outputs the corpus as a source tagged parallel corpus 32, including tags which identify candidate terms for which the contiguity constraint is to be enforced. The word aligner 24 takes as input the source tagged parallel corpus and alignment probabilities for individual words and outputs a word aligned corpus 34. The term extractor 26 takes as input the word aligned corpus 34 and extracts bilingual terminology therefrom which may be used to generate a term candidate translation table 36. The translation candidate filter 28 filters out less probable bilingual terminology in the table 36 to generate a BTL 18 in the form of a data structure, here illustrated as a term look up table. In the illustrated embodiment, a word translation probability estimator 38, which may be incorporated into the word aligner 24, outputs estimates of the individual word alignment probabilities for a pair of sentences.

Each of the components 20, 22, 24, 26, 28, 38 may be in the form of software which includes instructions for performing the exemplary method, which may be stored in associated memory 40. However, it is to be appreciated that the functions of two or more of the components may be combined or distributed among processing components.

The system 10 may be embodied in a computing device, such as a personal computer, e.g., a desktop, a laptop, palmtop computer, portable digital assistant (PDA), cellular telephone, pager, or other general purpose or dedicated computer device. The computing device may include the memory 40, which stores instructions executed by the processing components 20, 22, 24, 26, 28 in performing the exemplary method described herein. The memory 40 may represent any type of computer readable medium such as random access memory (RAM), read only memory (ROM), magnetic disk or tape, optical disk, flash memory, or holographic memory. In one embodiment, the memory 40 comprises a combination of random access memory and read only memory. In some embodiments, the processing components of the system 10 and memory 40 may be combined in a single chip. The components of the system may all be in the same physical location or may be distributed across a network, such as on a client and server. The documents 14, 16 which form the parallel corpus may be input to system 10 from any suitable source 42, such as one or more websites, a data storage device, a computing device, or the like.

With reference to FIG. 2, a flow diagram of an exemplary method for bilingual terminology extraction is shown. The method may be performed with the apparatus illustrated in FIG. 1.

The method begins at S100. At S102, a parallel corpus is input.

At S104 the parallel corpus is aligned at the sentence level.

At S106, terms are identified in the source text by matching part-of-speech patterns and tagged.

At S108, probability estimates for alignment of individual words in the target sentence to individual words in the source sentence are generated.

At S110, an alignment is generated for the source and target sentences in which words in the target sentence are aligned to terms and to words outside terms in the source sentence. In this step, a contiguity constraint is enforced which ensures that only contiguous subsequences of words in the target side are aligned to candidate terms on the source side. The source candidate terms may be those previously tagged according to one or more predefined classes, such as a class of Noun Phrases.

At S112, source terms are extracted and stored, together with the target subsequences that have been aligned to them, in a data structure, illustrated in FIG. 1 as a term translation candidate table 30.

At S114, filters 28 are applied to the term translation candidate table to generate a BTL 18, e.g., as a term look up table, although other data structures may be employed.

At S116, the BTL may be output or otherwise made accessible, e.g., to a statistical machine translation system. The method ends at S118.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

Further details of the exemplary system and method will now be described.

1. Sentence Alignment (S104), Candidate Source Term Identification (S106) and Word Translation Probability Estimation (S108)

The terminology extraction step (S112), described in further detail below, assumes a parallel corpus aligned at the sentence level. While in one embodiment, translation memories, roughly equivalent to sentence-aligned corpora, may be employed, thereby avoiding the need for performing step S104, in general, it may be easier to obtain a parallel corpus which is not already aligned at the sentence level. Various methods for alignment of parallel corpora which may be used in step S104 by the sentence aligner 20 are known and are described, for example, in the following references: William A. Gale, Kenneth W. Church, and David Yarowsky, "Using Bilingual Materials to Develop Word Sense Disambiguation Methods," in Fourth Int'l Conf. on Theoretical and Methodological Issues in Machine Translation (Montreal 1992); Michel Simard and Pierre Plamondon, "Bilingual Sentence Alignment: Balancing Robustness and Accuracy," Machine Translation, 13(11) (March 1998); Niraj Aswani and Robert Gaizauskas, "A Hybrid Approach to Align Sentences and Words in English-Hindi Parallel Corpora," in ACL Workshop on Building and Using Parallel Text (2005); and Anil Kumar Singh and Samar Husain, "Comparison, Selection and Use of Sentence Alignment Algorithms for New Language Pairs," in ACL Workshop on Building and Using Parallel Text (2005). These methods perform sentence alignment with a high degree of accuracy. The sentence aligner outputs a sentence level alignment in which source sentences are tagged according to the target sentence with which they have been aligned.

The terminological extraction method (S112) also assumes that occurrences of candidate terms for which the contiguity constraint will be enforced have been identified in the source portion of the aligned corpus (S106). In the exemplary embodiment, all candidate terms are Noun Phrases (NPs). The NPs can be bracketed (identified as a group of words and tagged) for many languages by matching a relatively reduced set of patterns over parts of speech.

A variety of techniques exist which may be used at S106 by the source term tagger 22 for identification of candidate source terms. Monolingual terminology extraction techniques which may be used are reviewed, for example, in Christian Jacquemin and Didier Bourigault, "Term Extraction and Automatic Indexing, in Ruslan Mitkov, Ed., Handbook of Computational Linguistics (Oxford University Press, 2000). For example, in the exemplary method, at S106, the source portion 14 of the aligned corpus 12 undergoes Part-of-Speech (POS) tagging. In particular, the source term tagger 22 includes a morphological analyzer which assigns, to each recognized word in the source portion 14, a part of speech (noun, verb, adjective, etc.). Following the POS-tagging, source candidate terms may be recognized, based on a set of patterns over parts of speech, encoded in the form of a finite-state transducer. It should be noted, however, that none of the following steps depends on the actual way by which candidate source terms are bracketed. Alternative methods can be used instead.

Term bracketing on only the source side 14 eliminates the need to ensure that the term bracketing is performed according to the same linguistic criteria in the source and target languages. While writing a set of patterns over parts of speech candidate terms for a single language is relatively easy, it is often more complicated to ensure that two such sets of patterns, over the source and target parts-of-speech, bracket candidates which are a translation of one another. For example, a frequent pattern for NP terms in English is given by a sequence of common nouns (e.g., "Telecommunication satellite"). However, noun modifiers in English tend to be translated as Prepositional Phrases in French (e.g. "Satellite de telecommunications"). Requiring the identification of candidate terms in both source and target portions 14, 16 may thus force the inclusion of patterns to recognize Noun Phrases with attached Prepositional Phrases. However, these patterns may tend to be over-inclusive and thus cover sequences in one language which may not correspond to recognized candidates in the other. For example, in the French portion 16, the term "appareil en mode veille" in the sentence "mettre l'appareil en mode veille" may not correspond to "Stand-by mode" in "Put the device in stand-by mode" in the English portion 14. By recognizing candidate terms in the source portion 14 only and then aligning target words to these terms, the exemplary method avoids the need for ensuring consistency of pattern sets altogether.

At S108, estimates of word translation probabilities in the form p(t|s) may be generated, which for each source word s, estimates the probability that it will be translated with word t in the target portion 16. One method for obtaining such estimates includes training a translation model according to an Expectation-Maximization algorithm. See, for example, Peter F. Brown, Vincent J. Della Pietra, Stephen A. Della Pietra, and Robert L. Mercer, The Mathematics of Statistical Machine Translation Parameter Estimation," Computational Linguistics, 19(2):263-311 (1993). Expectation-Maximization algorithms are described, for example, in Franz Josef Och and Hermann Ney, "A Systematic Comparison of Various Statistical Alignment Models," Computational Linguistics, 29(1):19-51 (2003). Suitable translation models may be developed using the Xerox TRINITY software, described in U.S. Pat. No. 6,885,985 to Hull, incorporated by reference. Other translation models of this type, usually referred to as IBM-1, 2, 3, or 4, have been implemented in, for example, the GIZA++ public domain software package (see, fjoch.com, GIZA++.html). Other methods for estimating word-level translation probabilities can also be used.

According to the specific language pair and corpus at hand, other preprocessing steps that can prove helpful prior to term extraction may include one or more of lowercasing (i.e., replacing all upper-case letters with the corresponding lower-case letters), lemmatization (identification of root forms of words, such as the singular form or plural nouns and the infinitive form of verbs), stemming (i.e., truncation of words to a fixed number of characters or by deleting a fixed number of characters from the end), and the decomposition of compound words (particularly in German, where compound nouns, such as Universitätsprofessor, are common, and may be decomposed into two or more words, e.g., Universitäts professor).

2. Word Alignment

Once candidate terms have been identified on the source side 14, sentence pairs are aligned at the word level. In the exemplary embodiment, attention is focused on candidate source terms that are classed as Noun Phrases (NP source terms). In performing the word alignment, a constraint is enforced that all target words aligned to a same NP source term must form a contiguous sequence. It is generally the case that noun phrases are formed by contiguous sequences of words in sentences, no matter the language. While in the following discussion, particular reference is made to NPs as source terms, the method is also applicable more generally to any class of subsequences that can be reliably detected in source documents and which is known to remain contiguous in target documents.

Figure 3:
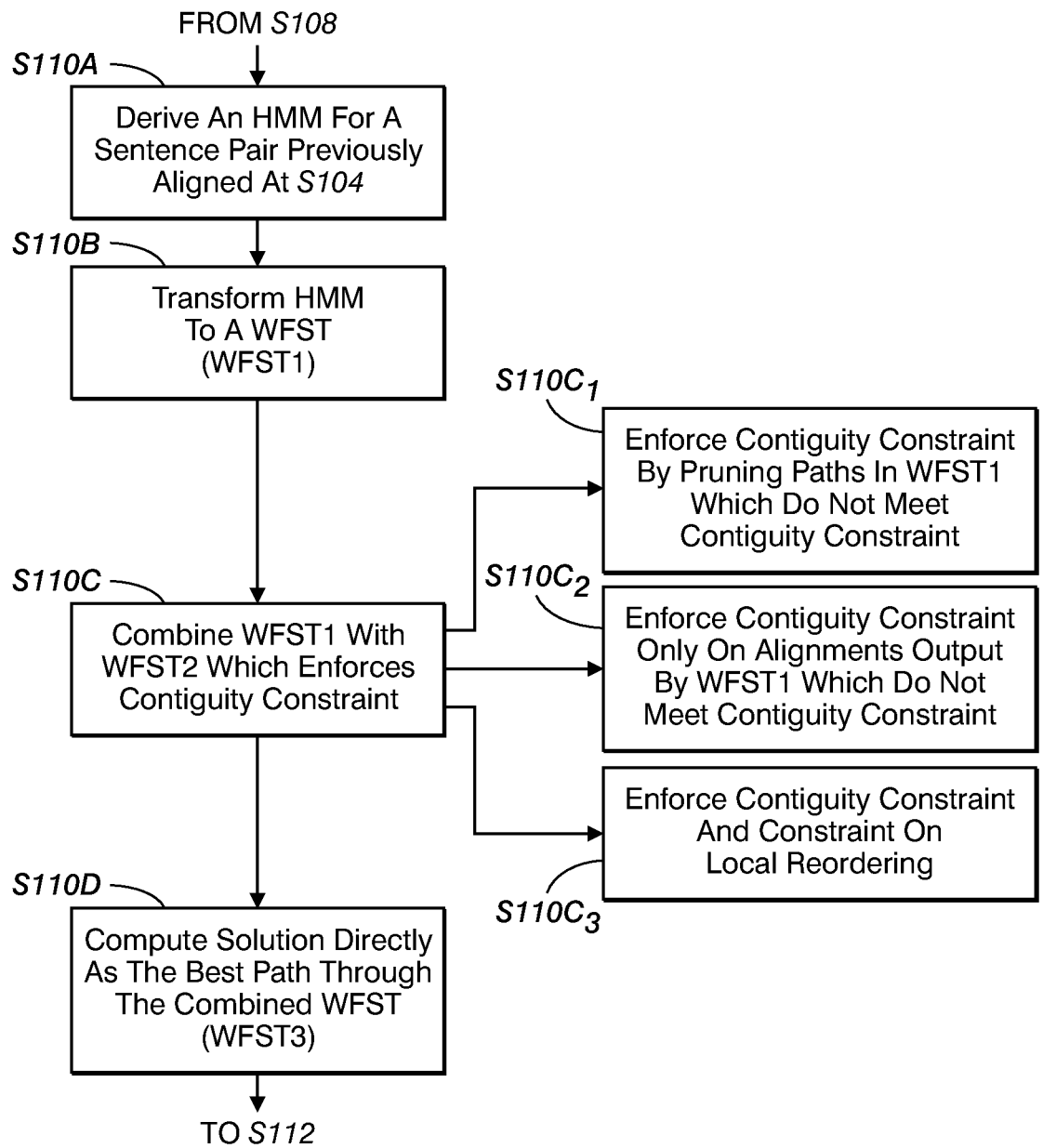
FIG. 3 is a flow diagram illustrating substeps of the alignment step of FIG. 2.

As illustrated in FIG. 3, the alignment step (S110) may proceed as follows: At S110A, a Hidden Markov Model is derived for each sentence pair previously aligned at S104. At S110B, the HMM is transformed into a Weighted Finite-State Transducer (WFST 1) such that computing the path of maximum weight in the WFST will be equivalent to computing the most likely path in the HMM. At S110C, WFST1 is composed with another Weighted Finite-State Transducer (WFST2) which enforces the contiguity constraint and, thereafter, at S110D, the solution is obtained directly as the best path in the combined WFST (WFST3) resulting from the composition of WFST1 and WFST2.

Three general methods of enforcing the contiguity constraint at S110C are contemplated, as described in sections 3.0, 3.1, and 3.2 below, respectively. In the first (S110C$_1$), the contiguity constraint is performed by pruning/preventing paths in WFST1 which do not meet the contiguity constraint. In the second (S110C$_2$), the alignment generated by WFST1 is checked to see if it complies with the contiguity constraint and if not, WFST1 is combined with an WFST2 which seeks to apply the constraint to those terms where the constraint was not met. In the third method (S110C$_3$), a method similar to S110C$_1$ is applied with an additional constraint which limits word reordering to local reordering. The method of S110C$_3$ is described with two variants, in sections 3.2.1 and 3.2.2, respectively.

Further details of these steps will now be described. Following conventional notation, it is assumed that English (e) is the source language, for which resources are available and a "foreign" (f) language is what has been described as the target language. As will be appreciated, the method is, in its elements described here, independent of the actual language pair.

Consider a sentence pair $(e_1^I, f_1^J)$, $e_1^I$ being the English sentence and $f_1^J$ its foreign translation consisting of I and J words, respectively. Consider that elements in $e_1^I$ can be either (possibly multi-word) terms or individual words occurring outside term boundaries. For reasons that will become clear soon, such elements may be referred to as states. Let $a_1^J$ be the sequence of alignment variables, with $a_j=i$ if and only if the foreign word $f_j$ is aligned to the English word/term $e_i$. In the following description attention is restricted to alignments in which a foreign word must be assigned to one and only one English state. The objective is to determine an optimal alignment $a_1^{J*}$ such that:

$$a_1^{J*} = \mathrm{argmax}_{a_1^J}\{P(a_1^J | f_1^J, e_1^I)\} \quad (1)$$

Applying Bayes' rule and making some conditional independence assumptions, this becomes:

$$a_1^{J*} = \mathrm{argmax}_{a_1^J}\left\{\prod_{j=1}^{J} p(f_j|e_{a_j})p(a_j|a_{j-1})\right\} \quad (2)$$

Equation 2 thus considers not only the product of emission probabilities, each being based on the probability that word of the target sentence is a translation of a word of the source sentence with which it is aligned, but also the probability of aligning the $j^{th}$ foreign word to a given English word, given the probability that the previous foreign word was aligned to the previous word in the English sentence. Thus, for example, consider the English sentence: "the cat is on the roof" and the French Sentence to which it is to be aligned at the word level: "le chat est sur le toit." The emission probability for the second occurrence of the word "the" in the English sentence with the first and second occurrences of the word "le" in the French sentence may be the same. However, because an alignment of "on" with "sur" would have a high emission probability, "the" (second occurrence) is more likely to be aligned in the optimal alignment with the second occurrence of "le" since in this case, no reordering of the French sentence is required.

The conditional probability distribution of Eqn. 2 can conveniently be modeled by means of a Hidden Markov Model (HMM) having states $e_i$, i=1 . . . I and emitting symbols in the foreign alphabet $\Sigma_F$. The term "alphabet" is used here in the language theory sense of a "set of symbols". In the present case, the symbols are words, not individual characters.

The emission probabilities can be estimated from the word translation probabilities computed at step S108 according to either of equations (3) and (4):

$$p(f|e) = \frac{1}{|W_e|} \sum_{w \in W_e} p(f|w) \quad (3)$$

$$p(f|e) = \max_{w \in W_e} p(f|w) \quad (4)$$

where $W_e$ indicates the set of English words forming state e, and is a singleton in case e is not a term. While, of the two alternatives, only Eqn. 3 ensures that the HMM will indeed globally describe a proper probability distribution, Eq. 4 better accounts for the expectation that the probability of aligning a foreign word to a given English state should be proportional to the probability of aligning it to the word in the state that is most likely to be its translation. For example, when estimating the probability of aligning the word telecomunicazioni in the foreign (Italian) sentence "La NASA ha lanciato un satellite per telecomunicazioni geostazionario" (NASA launched a geostationary telecommunication satellite) to the English term "geostationary telecommunication satellite", this probability should be close to p(telecomunicazioni/telecommunication), and not to the average of p(telecomunicazioni/geostationary), p(telecomunicazionitelecommunication), and p(telecomunicazioni/satellite). For transition probabilities, it is desirable for them to model the tendency of alignments to be monotonic, i.e., applying the principle that words tend to be translated by keeping the same order in the two languages. While enforcing this as a hard constraint would lead to many alignment errors, introducing a preference in this sense is justified for many language pairs.

Following the method outlined in Stephan Vogel, Hermann Ney, and Cristoph Tillmann, "HMM-based Word Alignment in Statistical Translation," in COLING 96, Copenhagen (1996), a parametric distribution that will depend only on the difference $d=a_j-a_{j-1}$ may be used. Let $B_0(z;\mu,I)$ be a base discrete probability distribution with mean $\mu$, and support in $\{-(I-1),\ldots I-1\}$, since the English state to which a new foreign word is aligned can never be more than $(I-1)$ positions before or after the state to which the current foreign word is aligned, and let $B(z;\mu,z_{min},z_{max})$ be the corresponding distribution truncated to $\{z_{min},\ldots,z_{max}\}$:

$$B(z; \mu, z_{min}, z_{max}) = \begin{cases} \dfrac{B_0(z; \mu, I)}{\sum_{z'=z_{min}}^{z_{max}} B_o(z'; \mu, I)} & \text{if } z_{min} \leq z \leq z_{max} \\ 0 & \text{otherwise} \end{cases}$$

Four exemplary alternatives for modeling transition probabilities, are:
1. two distinct distributions, one $B(d;0,-i+1,I-1)$ for English states associated with multi-word terms and one $B(d;1,-i+1,I-1)$ for states associated to words outside terms,
2. a single distribution obtained as a mixture of the two B distributions above:

$$p(a_j|a_{j-1})=\alpha_1 B(d;0,-i+1,I-i)+\alpha_2 B(d;1,-i+1,I-i)$$

with $0 \leq \alpha_1, \alpha_2 \leq 1$ and $\alpha_1+\alpha_2=1$, 3. a single distribution obtained as a mixture of three B distributions:

$$p(a_j \mid a_{j-1}) = \alpha_1 B(d; 0, -1+I-i) + \\ \alpha_2 B(d; 1, -i+1, I-i) + \\ \alpha_3 B(d; -1, -i+1, I-i)$$

with $0 \leq \alpha_i \leq 1, i = 1\ldots 3$ and $\alpha_1 + \alpha_2 + \alpha_3 = 1.$ 4. multiple states for each term, each with the same emission probabilities. For example, one could associate k states with a term of length k. Such states are ordered. The first state is visited when a first foreign word is aligned to the term. If a second word is aligned to the term, then the HMM transits to the second state, and so on. If additional foreign words are aligned once the $k^{th}$ state has been reached, then the HMM remains in the $k^{th}$ state. Transition probabilities can then follow a $B(z;i/k,-i+1,I-i)$ distribution for the $i^{th}$ state associated with a same term as illustrated in FIG. 4.

Figure 4:
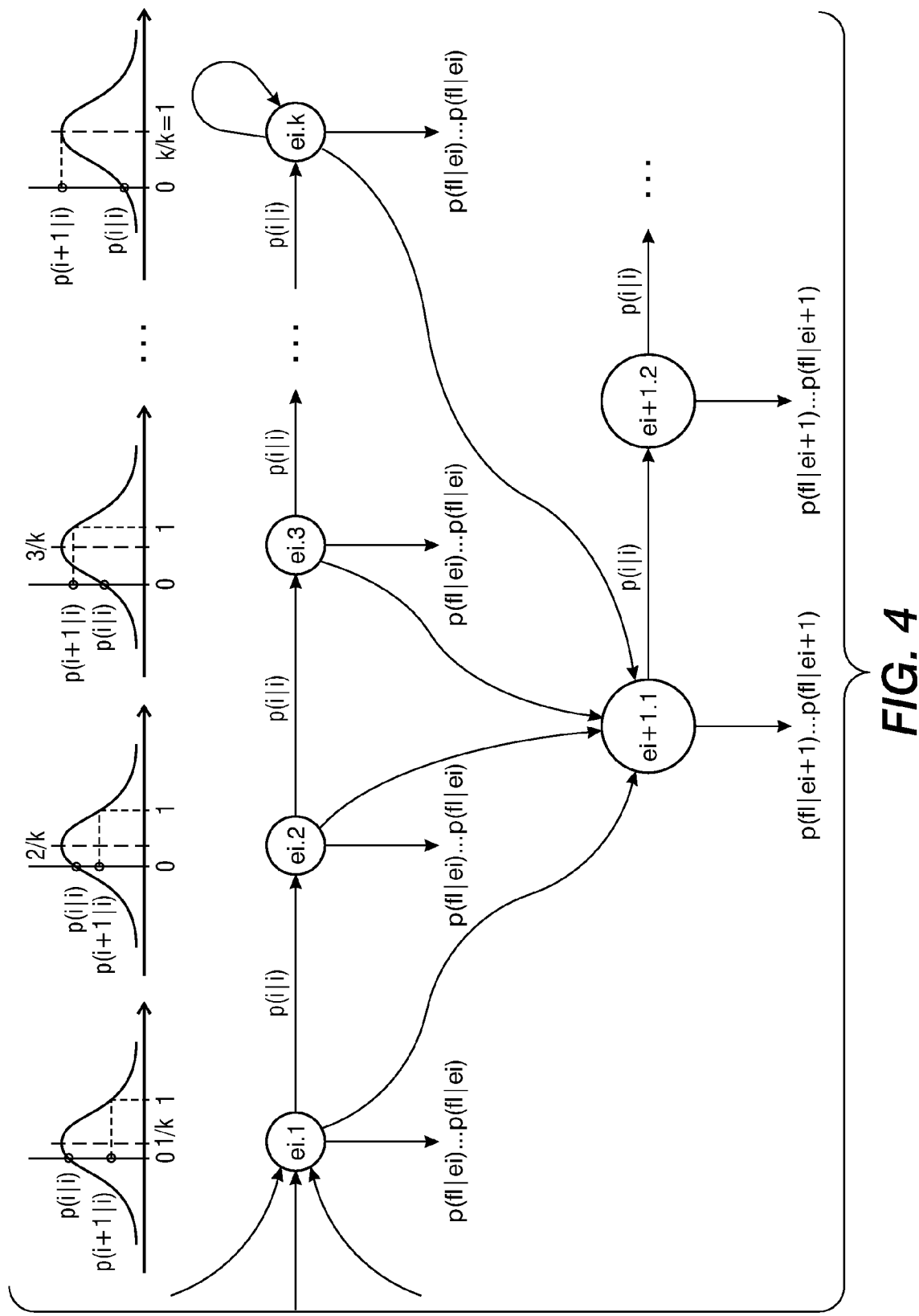
FIG. 4 illustrates a portion of an exemplary HMM with multiple states per term.

In FIG. 4, $e_i$ is an English term composed of k words. Every time a new word is aligned to the same term, the HMM transits into a state to the right. Transition probabilities are such that aligning a further word to the same term becomes increasingly unlikely.

All four alternatives allow modeling to reflect the fact that states associated with multiword terms will tend to have several foreign words aligned to them (mean zero: word $f_{j+1}$ will tend to be aligned to the same state as $f_j$) whereas states associated with out-of-term words will tend to have only one foreign word aligned (mean one: word $f_{j+1}$ will tend to be aligned to the word just after the one to which $f_j$ is aligned). The third form, moreover, allows explicit modeling of a tendency for word-order inversion between the two languages.

In the case of a mixture of discrete Bs, distinct mixing factors $\alpha_i$ can be estimated for each sentence pair by means of an instantiation of the expectation maximization (EM) algorithm. It can be expected that pairs where many long terms have been identified in the English sentence will have larger $\alpha_1$ than pairs with fewer or shorter terms. The details of the EM algorithm are provided in Section 6 below. While an asymptotic complexity analysis is not provided for the EM, it can be verified empirically that the time required for the EM to converge is negligible with respect to the subsequent operations, as demonstrated in the experiments reported in Section 4 below.

Figure 5:
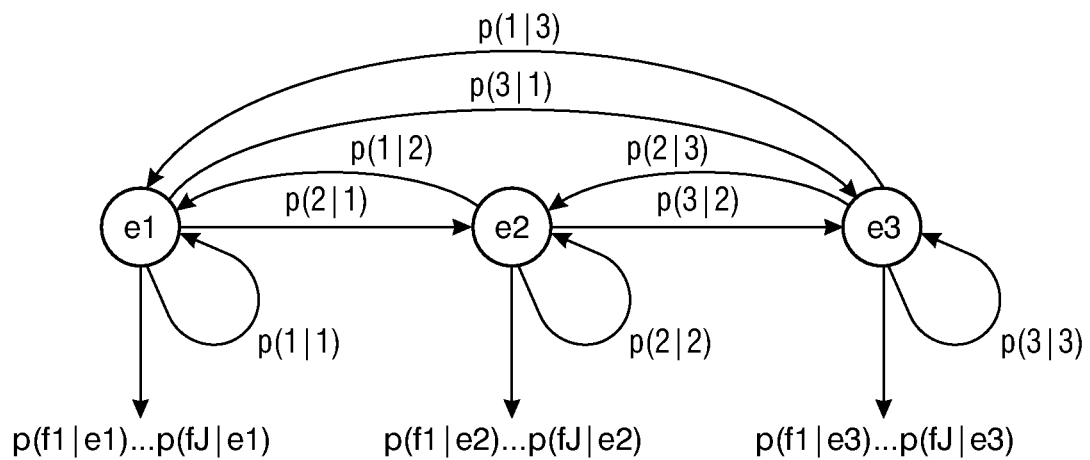
FIG. 5 illustrates an exemplary HMM for three English terms and four French words for the solutions in which there is a single state ($e_1, e_2, e_3$) per term. The transition probabilities are modeled by two-component discrete Gaussian mixtures, as illustrated in FIG. 6.
Figure 6:
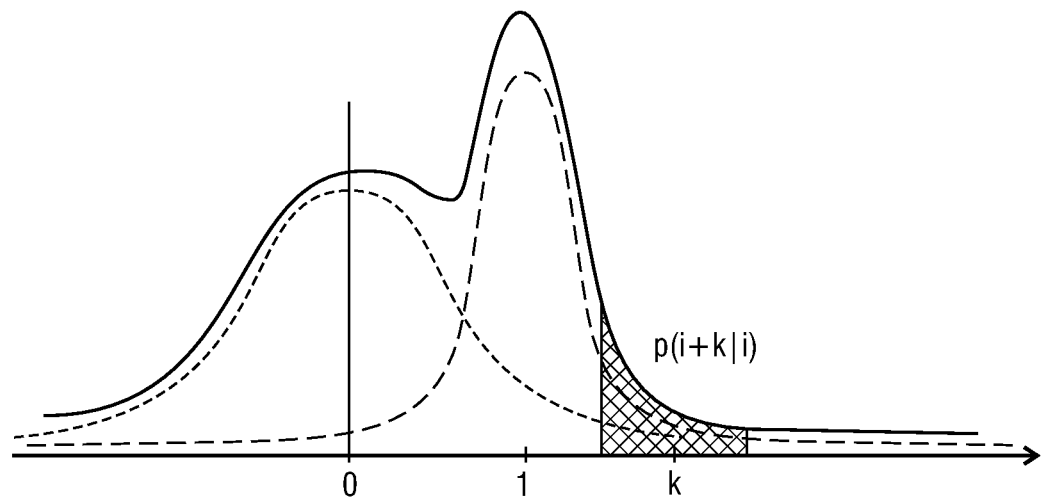

FIG. 5 illustrates a model for three English terms and J French words for the solutions in which there is a single state $(e_1, e_2, e_3)$ per term. The transition probabilities are modeled by two-component discrete Gaussian mixtures, as illustrated in FIG. 6.

The base distribution can be modeled in a variety of ways, including:
1. An appropriately translated Binomial distribution:

$$B_0(z; \mu, I) = \binom{2(I-1)}{z+I-1} p^{I+z-1}(1-p)^{I-z-1}$$

with:

$$p = \frac{\mu + I - 1}{2(I-1)}$$

2. Its discrete Normal approximation:

$$B_0(z;\mu)=N(z;\mu,\sqrt{2(I-1)p(1-p)})$$

with p as above and $$N(k; \mu, \sigma) = \int_{k-\frac{1}{2}}^{k+\frac{1}{2}} \frac{1}{\sigma\sqrt{2\pi}} e^{-\frac{(x-\mu)^2}{2\sigma^2}} dx$$

3. In the case of a mixture including a specific component for "backward" alignments, a Poisson distribution of mean $\mu$:

$$B_0(z; \mu, I) = \frac{e^{-\mu}\mu^z}{z!}$$

where for the negative component the sign of the argument is switched and $\mu=1$.

In all described alternatives for combining base distributions in transition distributions, it is not strictly necessary that all involved base distributions come from the same parametric family. For example, a binomial distribution could be used for the terms and a Poisson distribution for the out-of-term words.

The rest of the alignment procedure can be performed with any choice of transition probabilities, and those proposed above are simply examples of available alternatives. Ideally, the parametric form should be chosen to model as closely as possible some empirical distribution collected from manually aligned data coming from the same distribution as the training data.

The HMM thus obtained can easily be transformed into a WFST (WFST1) over the tropical semiring (non-negative reals with minimum and sum), as follows:
1. For every state of the HMM, a state is created in the WFST.
2. Between any two states $e_i$ and $e_{i'}$ (including i=i') J transitions are added, labeled by the foreign words on the input tape and i' on the output tape with weight $-\log p(i'|i) - \log p(f_k|e_{i'})$.
   An initial state is created from which there will be a transition to every state $e_i$ labeled $f_1$ with weight: $-\log p(f_1'|e_i)$
3. Every state except the initial one is final.

Figure 7:
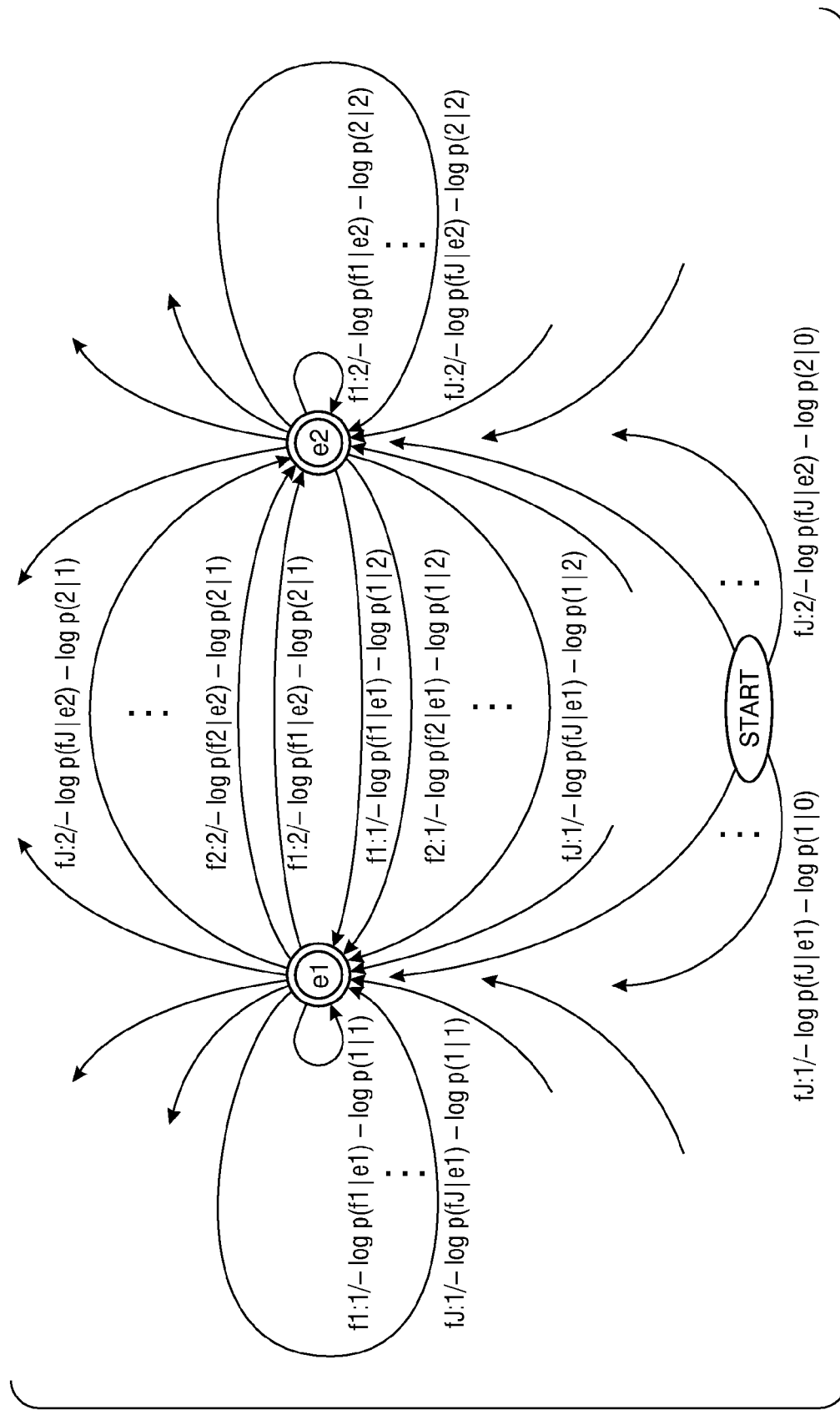
FIG. 7 illustrates a part of an automaton showing two states of a WFST built from the exemplary HMM, and their connection to the initial state.

A part of such an automaton is illustrated in FIG. 7, which illustrates two states of the WFST built from the HMM, and their connection to the initial state.

3. Enforcing Contiguity

After turning the HMM into a weighted transducer (S110B) the most probable alignment can be obtained by applying Dijkstra's or Viterbi's shortest path algorithm to it. If done directly with the weighted transducer WFST1 described above, however, it is not guaranteed that alignments respecting the contiguity constraint for candidate terms will be obtained. This constraint can be formally stated as follows:
   An alignment $a_1^J$ is contiguous if and only if there do not exist integers i,j,k with $1 \leq i \leq j < k \leq J$, such that $a_i = a_k = t$ and $a_j \neq t$, for any t such that $e_t$ is a term.

Solving this problem is similar to the problem of modeling a probability distribution over all alternative permutations of the chunks in a sequence (see, for example Shankar Kumar and William Byrne, "A Weighted Finite State Transducer Implementation of the Alignment Template Model for Statistical Machine Translation," in HLT-NAACL 2003 (Edmonton, Canada, 2003). In the present case, however, the foreign and the English sequences do not necessary have the same length, and the constraint to be enforced is somewhat different.

In the first method (S110C$_1$), given a WFST encoding an HMM with/states, an automaton is built (see, e.g., FIG. 8) with one state for each pair of a subset of states (term states visited before the last) and a state (the last visited state if it is a term state, a wildcard symbol otherwise). The path-set in this automaton will be such that only sequences over $\{1 \ldots I\}$ that do not contain discontinuous repetitions of term identifiers will be accepted:

third case, the current word is aligned to an out-of-term word: the previous term is added to the history, and the fact that the current foreign word is aligned to a non-term is recorded by having the wildcard symbol * in the second part of the state identifier. The fourth and fifth sets of edges deal with the cases in which the last alignment was made to an out-of-term word. By making every non-start state final the automaton obtained is one that accepts all and only the alignments satisfying the contiguity constraint.

Figure 8:
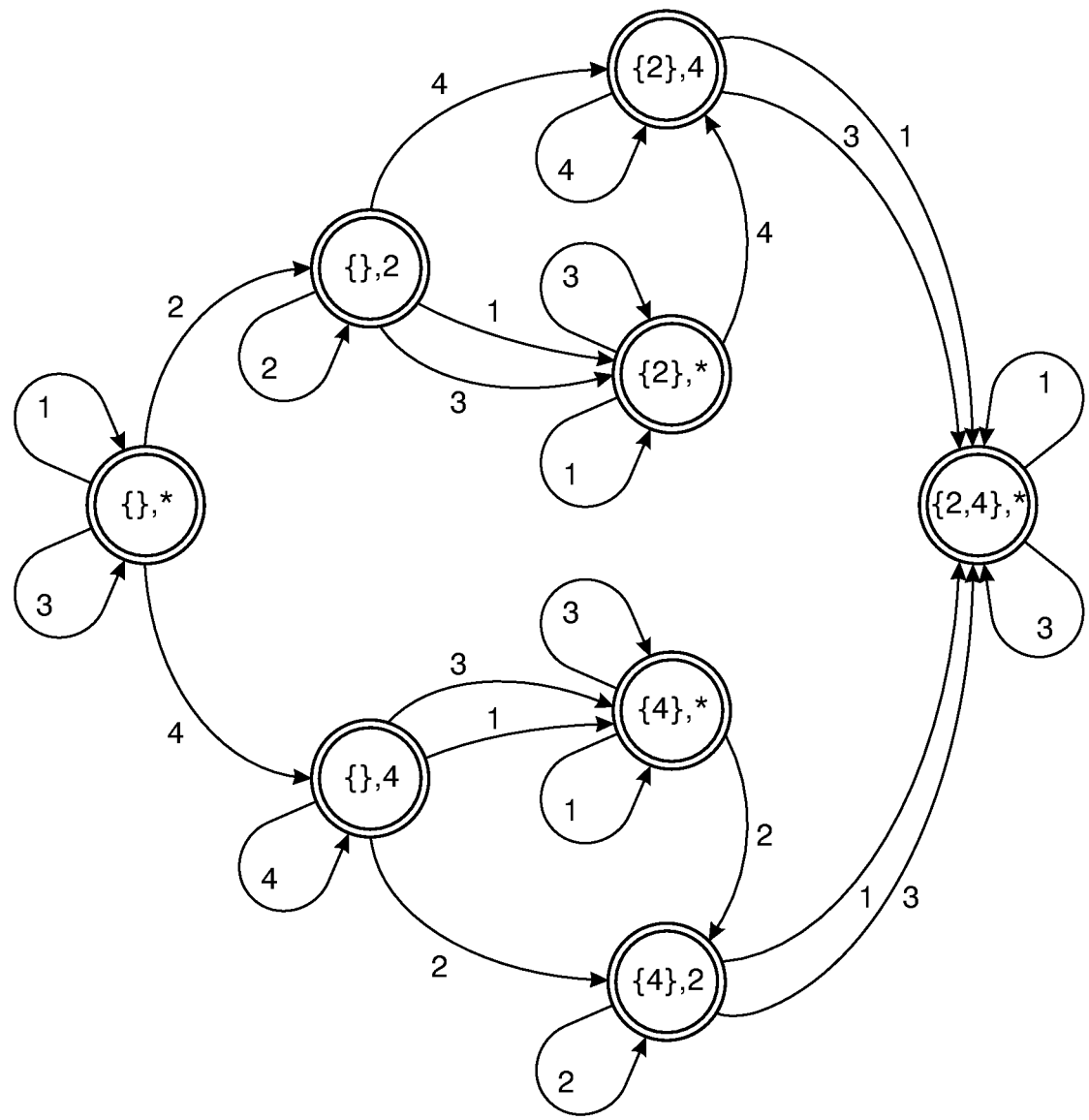
FIG. 8 illustrates an exemplary automaton for a WFST enforcing the contiguity constraint for an English sentence with two terms (at positions 2 and 4) and two out-of-term words (at positions 1 and 3). The automaton has one state for each pair of a subset of terms (term states visited before the last) and a HMM state (the last visited HMM state if it is a term state, a wildcard symbol otherwise)

By way of example, FIG. 8 illustrates a contiguity enforcing automaton for an English sentence with four states, two of which ($e_2$ and $e_4$) correspond to multi-word terms and two of which ($e_1$ and $e_3$) correspond to words occurring outside terms. For example, the alignment 1122143 is accepted, since it satisfies the contiguity constraint, while the alignment 12324 is not, since 2 is repeated twice separated by a 3.

An exemplary procedure at S110C$_1$ may thus include the following steps:

1. Compose the automaton built from the HMM (WFST1) with the contiguity enforcing automaton (WFST2)

2. Perform a Viterbi search on the resulting automaton (WFST3)

Constructing the contiguity enforcing automaton for a source sentence requires $O(2^{|\Sigma_t|}|\Sigma_t||\Sigma_P|)$ operations. In principle, this can be done once in advance for all possible combinations of $|\Sigma_t|$ and $|\Sigma_n|$ present in the corpus, renaming states for specific source sentences.

The worst-case complexity of transducer composition is, in the general case, $O(|Q_1|^2|Q_2|^2|\Sigma_1||\Delta_1(=\Sigma_2)||\Delta_2|)$. However, in the present case, in the first transducer the number of edges between any two states is only $O(|\Delta_1|=J)$, and not $O(|\Delta_1||\Sigma_1|)$, as in the general case: there is one transition for each distinct word in the foreign sentence. Moreover, the second transducer is a deterministic automaton, i.e., $\Sigma_2 = \Delta_2 = \Sigma_P$, on all transitions the input and the output symbol are identical, and $$P = (Q_P, \Sigma_P, I_P, F_P)$$

Figure 9:
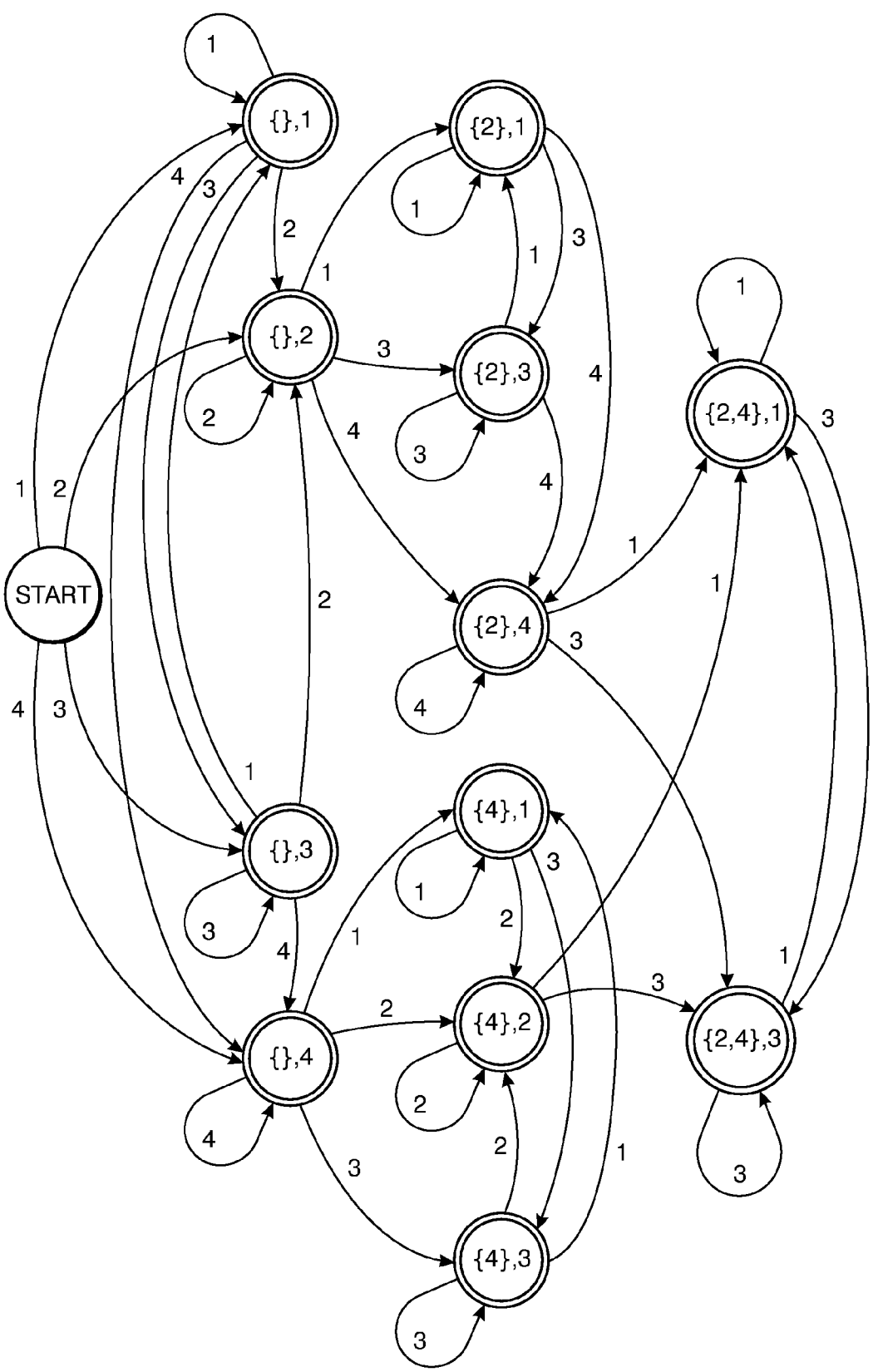
FIG. 9 illustrates an exemplary expanded contiguity enforcing automaton for an English sentence with four states, two of which ($e_2$ and $e_4$) correspond to multi-word terms and two of which ($e_1$ and $e_3$) correspond to words occurring outside terms.

$Q_P$: $\{\langle A, \sigma \rangle \in 2^{\Sigma_t} \times (\Sigma_t \cup \{*\}) | \sigma \notin A\}$ $\Sigma_P$: $\{1, \ldots, I\}$      $\Sigma_P = \Sigma_t \cup \Sigma_n, \Sigma_t \cap \Sigma_n = \emptyset$ $E_P$: $\langle A, \sigma \rangle, \sigma', \langle A \cup \{\sigma\}, \sigma' \rangle$     $\forall A \subseteq \Sigma_t, \forall \sigma \in \Sigma_t, \sigma \notin A, \forall \sigma' \in \Sigma_t, \sigma' \notin A \cup \{\sigma\}$ $\langle A, \sigma \rangle, \sigma, \langle A, \sigma \rangle$     $\forall A \subseteq \Sigma_t, \forall \sigma \in \Sigma_t, \sigma \notin A$ $\langle A, \sigma \rangle, \sigma', \langle A \cup \{\sigma\}, * \rangle$     $\forall A \subseteq \Sigma_t, \forall \sigma \in \Sigma_t, \sigma \notin A, \forall \sigma' \in \Sigma_n$ $\langle A, * \rangle, \sigma', \langle A, \sigma' \rangle$     $\forall A \subseteq \Sigma_t, \forall \sigma' \in \Sigma_t, \sigma' \notin A$ $\langle A, * \rangle, \sigma', \langle A, * \rangle$     $\forall A \subseteq \Sigma_t, \forall \sigma' \in \Sigma_n$ $I_P$: $\{\langle \emptyset, * \rangle\}$ $F_P$: $Q_P \setminus I_P$ Edges ($E_P$) from the first three sets apply when the word before the current one was aligned to a term. In the first case, the current word is aligned to a new term: the previous term is added to the set of terms already visited (in the first part of the state identifier) and the new term is recorded as current (in the second part of the identifier). In the second case, the current word is aligned to the same term as the previous word. In the there is at most one transition from any given state for any given symbol. Further, there is at most one transition between any pair of states. As a consequence, the composed automaton can simply be obtained by:
1. expanding every "wildcard" state in P into $|\Sigma_n|$ distinct states, redistributing transitions accordingly and introducing a special initial state (See, e.g. FIG. 9):

$$PE = (Q_{PE}, \Sigma_{PE}, E_{PE}, I_{PE}, F_{PE})$$

| | | |
|---|---|---|
| $Q_{PE}$: | $\{start\} \cup \{\langle A, \sigma\rangle \in 2^{\Sigma_t} \times \Sigma \mid \sigma_{PE} \notin A\}$ | |
| $\Sigma_{PE}$: | $\{1, \ldots, I\}$ | $\Sigma_{PE} = \Sigma_t \cup \Sigma_n, \Sigma_t \cap \Sigma_n = \emptyset$ |
| $E_{PE}$: | $(start, \sigma, \langle \emptyset, \sigma\rangle)$ | $\forall \sigma \in \Sigma_{PE}$ |
| | $(\langle A, \sigma\rangle, \sigma', \langle A \cup \{\sigma\}, \sigma'\rangle)$ | $\forall A \subseteq \Sigma_t, \forall \sigma \in \Sigma_t, \sigma \notin A, \forall \sigma' \in \Sigma_{PE}, \sigma' \notin A \cup \{\sigma\}$ |
| | $(\langle A, \sigma\rangle, \sigma, \langle A, \sigma\rangle)$ | $\forall A \subseteq \Sigma_t, \forall \sigma \in \Sigma_{PE}, \sigma \notin A$ |
| | $(\langle A, \sigma\rangle, \sigma', \langle A, \sigma'\rangle)$ | $\forall A \subseteq \Sigma_t, \forall \sigma \in \Sigma_n, \forall \sigma' \in \Sigma_{PE}, \sigma' \notin A \cup \{\sigma\}$ |
| $I_{PE}$: | $\{start\}$ | |
| $F_{PE}$: | $Q_{PE} \setminus \{start\}$ | |

2. expanding every transition on symbol $\sigma \in \Sigma_{PE}$ in the contiguity enforcing automaton with $|\Sigma_F|$ transitions, one for each possible foreign word:

| | | |
|---|---|---|
| $(start, \sigma, \langle \emptyset, \sigma\rangle)$ | $\rightarrow$ | $(start, f : \sigma/ - \log P(f \mid e_\sigma) - \log P(\sigma \mid 0), \langle \emptyset, \sigma\rangle)$ $\forall f \in \Sigma_F, \forall \sigma \in \Sigma_{PE}$ |
| $(\langle A, \sigma\rangle, \sigma', \langle A \cup \{\sigma\}, \sigma'\rangle)$ | $\rightarrow$ | $(\langle A, \sigma\rangle, f : \sigma'/ - \log P(f \mid e_{\sigma'}) - \log P(\sigma' \mid \sigma), \langle A \cup \{\sigma\}, \sigma'\rangle)$ $\forall A \subseteq \Sigma_t, \forall f \in \Sigma_F, \forall \sigma \in \Sigma_t, \sigma \notin A, \forall \sigma' \in \Sigma_{PE}, \sigma' \notin A \cup \{\sigma\}$ |
| $(\langle A, \sigma\rangle, \sigma, \langle A, \sigma\rangle)$ | $\rightarrow$ | $(\langle A, \sigma\rangle, f : \sigma/ - \log P(f \mid e_\sigma) - \log P(\sigma \mid \sigma), \langle A, \sigma\rangle)$ $\forall A \subseteq \Sigma_t, \forall f \in \Sigma_F, \forall \sigma \in \Sigma_{PE}, \sigma \notin A$ |
| $(\langle A, \sigma\rangle, \sigma', \langle A, \sigma'\rangle)$ | $\rightarrow$ | $(\langle A, \sigma\rangle, f : \sigma'/ - \log P(f \mid e_{\sigma'}) - \log P(\sigma' \mid \sigma), \langle A, \sigma'\rangle)$ $\forall A \subseteq \Sigma_t, \forall f \in \Sigma_F, \forall \sigma \in \Sigma_n, \forall \sigma' \in \Sigma_{PE}, \sigma' \notin A \cup \{\sigma\}$ | where $\Sigma_F$ denotes the set of distinct words in the foreign sentence to be aligned.

It can be seen that $|\Sigma_P| = I$ and $|\Sigma_F| \approx J$, since in the expanded contiguity enforcing automaton there are $O(I^2 2^{|\Sigma_t|})$ transitions, the complexity of the composition is $O(I^2 2^{|\Sigma_t|} J)$, leading to a composed transducer with $O(I 2^{|\Sigma_t|})$ states. Finally, the Viterbi algorithm is $O(I 2^{|\Sigma_t|} J)$ Overall computational complexity is thus $O(I^2 2^{|\Sigma_t|} J)$.

This complexity is much smaller than the worst-case complexity of enumerating all paths in the first transducer (i.e., all alignments) and checking whether they satisfy the contiguity constraint, which is $O(I^J)$.

3.1 Lazy Contiguity Enforcing (S110C$_2$)

In the previous section, the whole contiguity enforcing automaton is composed a priori with the HMM-derived WFST before the best-path algorithm is run (S110C$_1$). While this time-consuming operation ensures that the selected alignment will respect the contiguity constraint, it is actually unnecessary in all cases in which the best path in the original HMM-derived WFST does not violate the constraint. A variation of the previous method (S110C$_2$) thus consists of first running a best-path algorithm on the initial WFST (WFST1), checking whether the constraint is violated for any term and, if this is the case, compose the WFST with a reduced contiguity-enforcing automaton (WFST2) limited to the terms for which contiguity was indeed violated, and iterate (see, e.g., Algorithm 1, below). If the constraint is not violated, the method may proceed directly to S110D. It is easily verified that the following automaton $A_\sigma$ enforces the contiguity constraint for the term $\sigma \in \Sigma_t$:

| | | |
|---|---|---|
| $\Sigma_A$: | $\{1, \ldots, I\}$ | $\Sigma_A = \Sigma_t \cup \Sigma_n, \Sigma_t \cap \Sigma_n = \emptyset$ |
| $Q_A$: | $\{0, 1, 2\}$ | |
| $E_A$: | $(0, \sigma', 0)$ | $\forall \sigma' \in \Sigma_A, \sigma' \neq \sigma$ |
| | $(0, \sigma, 1)$ | |
| | $(1, \sigma, 1)$ | |
| | $(1, \sigma', 2)$ | $\forall \sigma' \in \Sigma_A, \sigma' \neq \sigma$ |
| | $(2, \sigma', 2)$ | $\forall \sigma' \in \Sigma_A, \sigma' \neq \sigma$ |
| $I_A$: | $\{0\}$ | |
| $F_A$: | $Q_A$ | |

By way of example, FIG. 10 illustrates a three-state automaton enforcing the constraint that whenever the state $\sigma$ in the HMM-derived WFST is left, it is never entered again. For simplicity every single arc with label $\Sigma \setminus \sigma$ represents a set of arcs, one for each $\sigma' \neq \sigma$.

Each composition has the effect of doubling the number of states and edges. In the worst-case, the algorithm is forced to compose again and again for enforcing contiguity one term at a time, and the finally resulting automaton is the same as what would be obtained by composing $W_{HMM}$ (WFST1) directly with P (WFST2). In this case, there is no asymptotic penalty in the repeated composition itself. However, the best-path algorithm is executed unsuccessfully $|\Sigma_t| - 1$ times on WFSTs of exponentially increasing size. Notice, though, that the global asymptotic complexity for all repetitions of the best-path algorithm is the same as the complexity of the last iteration, because $$\Sigma_{i=0}^{|\Sigma_t|} 2^i IJ = IJ(2^{|\Sigma_t|+1} - 1)$$

and $$O(IJ(2^{|\Sigma_t|+1} - 1)) = O(IJ 2^{|\Sigma_t|}).$$

In other words, by performing the composition lazily the computational penalty is at most a constant factor in time, and nothing in space.

Algorithm 1 The iterative algorithm that only composes the HMM-derived WFST with single-term contiguity checker for terms for which contiguity was violated.

```
W ← W_HMM
repeat
    π ← Viterbi(F, W)
    Z ← violate-contiguity(π, W)
    for all z in Z do
        W ← W · A_z
until Z = ∅
return π
```

3.2 Local Reordering

While the permutation automaton described above is, in many cases, an appropriate solution, it has the drawback of growing exponentially in size with the number of source terms. The present section describes a method for enforcing the contiguity constraint which is not exponential in size in the length of the input and consists of a single best-search path on a multi-tape weighted finite-state transducer ($S110C_3$). The reduction in complexity is obtained at the price of allowing only local reorderings between the source and the target sequence. Reordering can be considered to be any deviation from the sequential alignment of words in the target sentence to words in the source sentence. Local reordering permits some reordering, but sets a maximum distance (maximal jump length $m_j$) which a word can be moved from its position in what would be a monotonic alignment. A permutation $\pi$ is a local reordering with jump length $m_j$ and a window size $m_w$ if and only if every element is at most $m_j$ steps away from its position in the identity permutation (i.e. $|\pi_i - i| \le m_j$) and every deviation from the identity permutation occurs within a subsequence of size at most $m_w$ (i.e., the corresponding permutation matrix is block-diagonal with blocks of size at most $m_w$). For example, for maximal jump length $m_j=2$ and window size $m_w=3$, an acceptable permutation would be (3,2,1,4) but not (3,4,1,2). It is possible to write automatically automata to recognize sequences of jumps (i.e., $\pi_1-1$, $\pi_2-2, \ldots, \pi_1-1$) corresponding to local reorderings for arbitrary values of $m_j$ and $m_w$. First, a description will be provided as to how such a local reordering automata can be automatically generated, and then a method will be described for compiling the original HMM into a new (multi-tape) WFST that represents the same probability distribution but outputs a sequence of jumps as well as a sequence of visited states, and that can thus be joined with the local reordering automaton.

Algorithm 2 builds a local reordering automaton given the parameters $m_j$ and $m_w$.

---
Algorithm 2 Reordering Automata($m_j, m_w$) (R)
---

1: Create state $s_0$, which will be the initial state and the only final state
2: Add a loop edge to $s_0$ labeled with 0
3: Generate the list Perm of all possible permutations of $m_w$ many elements
4: Create empty list JumpSeq
5: for all $\pi$ in Perm do
6:    tmp=""
7:    for all j in $\{1, 2, \ldots m_w\}$ do
8:       if $|\pi_j - j| \le m_j$ then
9:          Append $\pi_j - j$ to tmp
10:   if length(tmp) = $m_w$ then
11:      Add tmp to JumpSeq
12: for all i in JumpSeq do
13:   Strip leading and trailing 0s from i
14:   Create state $s_{i,1}$
15:   Add an arc going from $s_0$ to $s_{i,1}$ labeled by i[1]
16:   for all j in $\{2, \ldots, m_w - 1\}$ do
17:      Create state $s_{i,j}$
18:      Add an arc going from $s_{i,j-1}$ to $s_{i,j}$ labeled by i[j]
19:   Add an arc going from $s_{i,m_w-1}$ to $s_0$ labeled by i[$m_w$]
20: Minimize the antomaton

---

Although the construction takes $O(m_w! m_w \log(m_w! m_w))$ time, naturally it need be done once for the desired (max. jump, window size) pair, and need not be repeated for each sentence.

Algorithm 3, below, provides a more direct way of building the local reordering automaton. In the algorithm, $Z'=\{x | x+1 \in Z, -m_j \le x \le m_j\}$. In this algorithm, states are triples (x,y,Z), where x is the sum of the deviations from the identical permutation on paths reaching the state, y is the length of the paths reaching the state, and Z is a blacklist of deviations that cannot follow the previous ones, since this would amount to having repetitions in the permutation. The start state is $\langle 0, 0, \emptyset \rangle$, and is initially inserted in a stack. Elements are popped out from the stack one at a time, and inserted in the state set Q. Outgoing edges for them are added to the edge set E for legal subsequent deviations. In this embodiment, a legal deviation:

1. cannot be lower than $-m_j$, nor greater than $m_j$ by definition of $m_j$;
2. cannot be lower than $-y$, since an element in the y+1 position of a permutation cannot be more than y positions to the right of where it would be in the identical permutation;
3. cannot be part of the blacklist;
4. cannot lead to a state with negative cumulative deviation, since for all permutation $\pi$ of $\{1 \ldots n\}$ and for all $k \le n$, it is $\Sigma_{i=1}^{k} \pi_i - 1 \ge 0$
5. cannot lead to a state with cumulative deviation larger than what is possible to reabsorb with steps of size $m_j$ within a path of maximal length $m_w$.

Furthermore, if the cumulative deviation becomes 0 then a transition to the initial state is inserted, since $\Sigma_{i=1}^{k} \pi_i - 1 = 0$ with $\pi_i \ne \pi_j, \forall i, j$ holds if $\pi_1 \ldots \pi_k$ is a permutation of $1 \ldots k$.

---
Algorithm 3 ReorderingAutomata($m_j, m_w$)(R)
---

Require: $m_j, m_w \ge m_j$
  $Q \leftarrow \emptyset; E \leftarrow \emptyset;$ /*Initialise the state and edge sets.*/
  push($\langle 0, 0, \emptyset \rangle$,S) /*Push the start state in the stack.*/
  while nonempty(S) do
    $\langle x, y, Z \rangle \leftarrow$ pop(S) /*Pop a state from the stack.*/
    $Q \leftarrow Q \cup \{\langle x, y, Z \rangle\}$ /*Insert it in the state set.*/
    /*For all deviations in a feasibility interval:*/
    for m = max$\{-y, -m_j\}$ to $m_j$ do
      /*If the deviation is legal:*/
      if m $\notin$ Z and 0 < (x + m) $\le m_j(m_w - y - 1)$ then
        if $\langle x + m, y + 1, Z' \cup \{m - 1\} \rangle \notin S \cup Q$ then
          /*Push the corresponding destination state in the stack.*/
          push($\langle x + m, y + 1, Z' \cup \{m - 1\} \rangle$, S)
      /*Add the new transition to the edge set.*/
      E $\leftarrow$ E $\cup \{\langle x, y, Z \rangle, m, \langle x + m, y + 1, Z' \cup \{m - 1\} \rangle\}$
      /*If the deviation is legal and leads back to the start state:*/
      if m $\notin$ Z and x + m = 0 then
        /*Insert a new transition to the start state.*/
        E $\leftarrow$ E $\cup \{\langle x, y, Z \rangle, m, \langle 0, 0, \emptyset \rangle\}$
  $\Sigma \leftarrow \{-m_j, \ldots, m_j\}$
  I $\leftarrow \langle 0, 0, \emptyset \rangle$
  F $\leftarrow \{I\}$
  return $\langle \Sigma, Q, E, I, F \rangle$

---

FIG. 11 shows the automaton that would be produced for $m_j=2$ and $m_w=3$. Since with appropriate indexing the check $\langle x+m, y+1, Z' \cup \{m-1\} \rangle \notin S \cup Q$ can be performed in $O(m_j)$, the complexity of the algorithm is $O(m_j^2 2^{m_w})$.

In order to be able to use this automaton, a suitable input is generated. In particular, the WFST built from the HMM should output jumps between term positions instead of plain word/term identifiers as with the permutation automaton ($S110C_1$). Moreover, the reordering automaton only accepts (appropriately constrained) permutations of the state identifiers. There are two issues then that must be solved in order to use an approach based on the reordering automaton. The first is related to the fact that repeated visits to a same term should be permitted, provided they are contiguous. The jump sequence will thus need to be generated from a term sequence from which contiguous repetitions are replaced by a single occurrence of a special term identifier. A second issue is related to whether or not the additional constraint that all English terms must be aligned to some foreign word is acceptable. A first solution is presented for the case in which it is assumed that all occurrences of terms on the English side have a counterpart on the foreign side (Section 3.2.1). A modification is then presented (Section 3.2.2) that relaxes this assumption at the cost of introducing some complexity in the process.

3.2.1 Cascaded Automata with all English Terms Aligned

Figure 12:
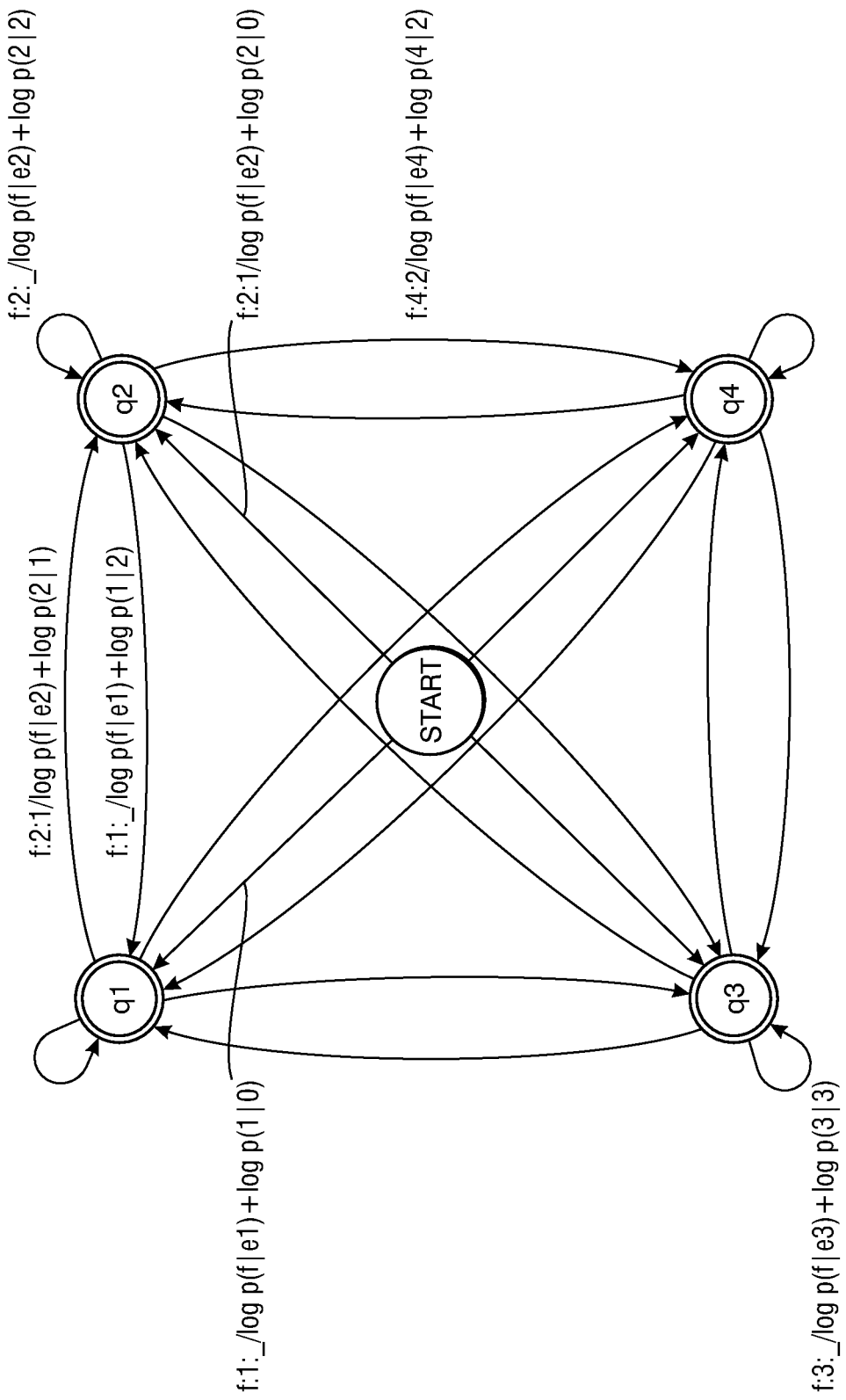
FIG. 12 illustrates an example of 3-tape WFST encoding an HMM.

In order to produce appropriate input for the reordering automaton, an additional tape is added to the WFST derived from the original HMM, besides the first tape reading the input sequence of foreign words and the second tape writing the sequence of English word/term identifiers corresponding to the alignment. A special term identifier ranging from 1 to the number of terms in the sentence (1 for $e_2$ and 2 for $e_4$ in the example) is written on the third tape every time a term-state is entered from a different state, as illustrated in FIG. 12. In FIG. 12, $e_2$ and $e_4$ are terms, $e_1$ and $e_3$ are out-of-term words. Only one transition for every state pair is shown, while in the actual automaton there is one for every word f in the foreign sentence. Also, for ease of representation, only some labels/weights are shown.

Formally:

$H = (Q_H, \Sigma_H, E_H, I_H, F_H, A)$

| | | |
|---|---|---|
| $Q_H$: | $\{start\} \cup \{q_\sigma | \sigma \in \Sigma_H\}$ | |
| $\Sigma_H$: | $\Sigma_{H1} \times \Sigma_{H2} \times \Sigma_{H3}$ | |
| $\Sigma_{H1}$: | $\Sigma_F$ | |
| $\Sigma_{H2}$: | $\{1, \ldots, I\}$ | $\Sigma_{H2} = \Sigma_t \cup \Sigma_n, \Sigma_t \cap \Sigma_n = \emptyset$ |
| $\Sigma_{H3}$: | $\{1, \ldots, |\Sigma_t|\}$ | |
| $E_H$: | $(start, f : \sigma : \epsilon, q_\sigma)/ - \log P(f|e_\sigma) - \log P(\sigma|0)$ | $\forall f \in \Sigma_F, \forall \sigma \in \Sigma_n$ |
| | $(start, f : \sigma : t_\sigma, q_\sigma)/ - \log P(f|e_\sigma) - \log P(\sigma|0)$ | $\forall f \in \Sigma_F, \forall \sigma \in \Sigma_t$ |
| | $(q_\sigma, f : \sigma' : \epsilon, q_{\sigma'})/ - \log P(f|e_{\sigma'}) - \log P(\sigma'|\sigma)$ | $\forall f \in \Sigma_F, \forall \sigma \in \Sigma_{H2}, \forall \sigma' \in \Sigma_n$ |
| | $(q_\sigma, f : \sigma' : t_{\sigma'}, q_{\sigma'})/ - \log P(f|e_{\sigma'}) - \log P(\sigma'|\sigma)$ | $\forall f \in \Sigma_F, \forall \sigma \in \Sigma_{H2}, \forall \sigma' \in \Sigma_t, \sigma \neq \sigma'$ |
| | $(q_\sigma, f : \sigma : \epsilon, q_\sigma)/ - \log P(f|e_\sigma) - \log P(\sigma|\sigma)$ | $\forall f \in \Sigma_F, \forall \sigma \in \Sigma_t$ |
| $I_H$: | $\{start\}$ | |
| $F_H$: | $Q_H \setminus \{start\}$ | | where $t_\sigma$, $\sigma \in \Sigma_t$ is a special term identifier in $\{1, \ldots, |\Sigma_t|\}$ and $A = \langle R, +, \min, 0, +\infty \rangle$ is the tropical semiring.

Let two auxiliary finite-state machines be defined: the identical permutation automaton I and the difference automaton D: the first just encodes an increasing integer sequence $1 2 \ldots |\Sigma_t|$:

$I = (Q_I, \Sigma_I, E_I, I_I, F_I)$

| | |
|---|---|
| $Q_I$: | $\{start\} \cup \{q_i | i \in \{1, \ldots, |\Sigma_t|\}\}$ |
| $\Sigma_I$: | $\{1, \ldots, |\Sigma_t|\}$ |
| $E_I$: | $(start, 1, q_1)$ |
| | $(q_i, i+1, q_{i+1})$  $\forall i, 1 \leq i < |\Sigma_t|$ |
| $I_I$: | $\{start\}$ |
| $F_I$: | $\{q_{|\Sigma_t|}\}$ | while the second has three tapes and outputs on the third the difference of $D = (Q_D, \Sigma_D, E_D, I_D, F_D)$

| | |
|---|---|
| $Q_D$: | $\{start\}$ |
| $\Sigma_D$: | $\{1, \ldots, |\Sigma_t|\} \times \{1, \ldots, |\Sigma_t|\} \times \{1-|\Sigma_t|, \ldots, |\Sigma_t|-1\}$ |
| $E_D$: | $(start, \sigma : \sigma' : \sigma - \sigma', start)$ |
| | $\forall \sigma, \sigma' \in \Sigma_t$ |
| $I_D$: | $\{start\}$ |
| $F_D$: | $\{start\}$ |

By appropriately joining the transducers defined so far, a transducer accepting only alignments corresponding to local reorderings of the English terms is obtained:

$$G = \left(\left(H \underset{\{3=1\}}{\bowtie} D\right) \underset{\{4=1\}}{\bowtie} I\right) \underset{\{5=1\}}{\bowtie} R$$

where the result G has five tapes: $H_1$: $H_2$: $H_3 = D_1$: $D_2 = I_1$: $D_3 = R_1$. The best alignment satisfying the contiguity constraint and representing a local reordering (with parameters $m_j$ and $m_w$) is then simply obtained through a best-path search on G, on the tape $G_2$. Algorithms for joining and composing automata are described in Andre Kempe, Jean-Marc Champarnaud, Frank Guigne, and Florent Nicart, "WFSM Auto-intersection and Join Algorithms, in FSMNLP 2005 (Helsinki, Finland, 2005).

3.2.2 Cascaded Automata with Possibly Empty Alignments for Some English Terms

The method described above works if it is acceptable to impose the constraint that all English terms are aligned with at least one foreign word. Where this additional constraint is unacceptable, the contiguity constraint with local reordering can still be enforced, although the method tends to be more complex.

The reordering automaton recognizes the language of all jump sequences corresponding to local reordering permutations. The jump sequence can be generated by computing a symbol-wise difference between the sequence of term identifiers in the order they were entered and their identical permutations. This may be performed simply through the D transducer because these two sequences have same length. If the constraint that all English terms are aligned is to be relaxed, a way to "visit" all states of the HMM other than by aligning a foreign word to it is needed. This can be achieved by introducing special transitions going into term states that do not "use" any input symbol. When assessing the probability of an alignment, this will alter the contribution of the transition probabilities. To account for this effect, two separate WFSTs are created from the original HMM: one (E) accounts for the emission probabilities only, and the other (T) accounts for the transition probabilities. The former will accept the input sequence, and will output on one of its tapes a sequence (with no contiguous repetitions) of identifiers of those visited states which are aligned to real foreign words only:

$$E = (Q_E, \Sigma_E, E_E, I_E, F_E, A)$$

$Q_E$: $\{start\} \cup \{q_\sigma | \sigma \in \Sigma_{E2}\}$ $\Sigma_E$: $\Sigma_{E1} \times \Sigma_{E2} \times \Sigma_{E3}$ $\Sigma_{E1}$: $\Sigma_F$ $\Sigma_{E2}$: $\{1, \ldots, I\}$    $\Sigma_{E2} = \Sigma_t \cup \Sigma_n, \Sigma_t \cap \Sigma_n = \emptyset$ $\Sigma_{E3}$: $\{1, \ldots, |\Sigma_t|\}$ $E_E$: 
- $(start, f : \sigma : \epsilon, q_\sigma)/ - \log P(f|e_\sigma)$    $\forall f \in \Sigma_F, \forall \sigma \in \Sigma_n$
- $(start, f : \sigma : t_\sigma, q_\sigma)/ - \log P(f|e_\sigma)$    $\forall f \in \Sigma_F, \forall \sigma \in \Sigma_t$
- $(start, \epsilon : \epsilon : t_\sigma, q_\sigma)/0$    $\forall \sigma \in \Sigma_t$
- $(q_\sigma, f : \sigma' : \epsilon, q_{\sigma'})/ - \log P(f|e_{\sigma'})$    $\forall f \in \Sigma_F, \forall \sigma \in \Sigma_{E2}, \forall \sigma' \in \Sigma_n$
- $(q_\sigma, f : \sigma' : t_{\sigma'}, q_{\sigma'})/ - \log P(f|e_{\sigma'})$    $\forall f \in \Sigma_F, \forall \sigma \in \Sigma_{E2}, \forall \sigma' \in \Sigma_t, \sigma \neq \sigma'$
- $(q_\sigma, f : \sigma : \epsilon, q_\sigma)/ - \log P(f|e_\sigma)$    $\forall f \in \Sigma_F, \forall \sigma \in \Sigma_t$
- $(q_\sigma, \epsilon : \epsilon : t_\sigma, q_\sigma)/0$    $\forall \sigma \in \Sigma_t$ $I_E$: $\{start\}$ $F_E$: $Q_E \setminus \{start\}$ where $t_\sigma, \sigma \in \Sigma_t$ is a special term identifier in $\{1, \ldots, |\Sigma_t|\}$ and $A = \langle R, +, \min, 0, +\infty \rangle$ is the tropical semiring.

The latter will compute the contribution of transition probabilities based on this state sequence:

$$T = (Q_T, \Sigma_T, E_T, I_T, F_T, A)$$

$Q_T$: $\{start\} \cup \{q_\sigma | \sigma \in \Sigma_T\}$ $\Sigma_T$: $\{1, \ldots, I\}$ $E_T$: 
- $(start, \sigma, q_\sigma)/ - \log P(\sigma|0)$    $\forall \sigma \in \Sigma_T$
- $(q_\sigma, \sigma', q_{\sigma'})/ - \log P(\sigma'|\sigma)$    $\forall \sigma, \sigma' \in \Sigma_T$ $I_T$: $\{start\}$ $F_T$: $Q_T \setminus \{start\}$ By joining these transducers in the appropriate way with the D, I and R transducers introduced before, a transducer is obtained accepting only alignments corresponding to local reorderings of the English terms, and in which some English terms can remain unaligned:

$$G' = \left(\left(\left(E \underset{\{2=1\}}{\bowtie} T\right) \underset{\{3=1\}}{\bowtie} D\right) \underset{\{4=1\}}{\bowtie} I\right) \underset{\{5=1\}}{\bowtie} R \quad (6)$$

where the result G' has five tapes: $E_1$: $E_2 = T_1$: $E_3 = D_1$: $D_2 = I_1 : D_3 = R_1$. The best alignment satisfying the contiguity constraint and representing a local reordering (with parameters $m_j$ and $m_w$) is then obtained through a best-path search on G', on the tape $G'_2$.

Without intending the scope of the exemplary embodiment, the following Examples demonstrate the application of the methods disclosed herein to word alignment.

4. Examples

Experiments were undertaken by applying the described word-alignment methods to multilingual terminology extraction. 368 sentence pairs extracted from operating manuals in English-German were annotated with term boundaries and alignments by a native speaker of German. Since the primary interest of the experiment was in assessing the performance of the word alignment component, manually identified English terms were taken as a base for the projection. In actual operation, NPs extracted using patterns of parts-of-speech would be used instead. German words were aligned to English terms and out-of-term words according to variants of the methods described above:

PERM: up-front composition with the permutation automaton imposing contiguity on all terms and non-terms. This limited the value of I to 14;

SELECT: up-front composition, limiting enforcement of the contiguity constraint to terms only (analogous to the method outlined in $S110C_1$);

REORD: local reordering method with $m_j = 2$ and $m_w = 3$ (similar to $S110C_3$)

SYMMETRIC: a standard symmetric method by which term candidates are first identified in German using POS patterns and are then aligned.

For each method, the number of exact matches was measured, together with precision, recall and F-score at the word level according to the following definitions:

$$P = \frac{\sum_{i=1}^{n} p_i}{n}; \quad p_i = \frac{a_i}{c_i}$$

$$R = \frac{\sum_{i=1}^{n} r_i}{n}; \quad r_i = \frac{a_i}{w_i}$$

$$F = \frac{2PR}{P+R}$$

where $c_i$ is the number of words identified as part of terms in sentence i, $w_i$ is the number of words in terms in the reference for sentence i, and $a_i$ is the number of correctly aligned in-term tokens in sentence i. Test results are shown in Table 1 where base terms are those for which some translation was provided in both the target and the source sentence.

From such preliminary experiments, it can be seen that performance is comparable with the symmetric method, which is more resource-intensive, although those are somewhat underestimated due to the fact that an effective recall-oriented heuristic (although possibly precision-degrading) is not used.

TABLE 1

| Method | Base terms | Exact matches | Precision P | Recall R | F-score F |
|---|---|---|---|---|---|
| PERM | 368 | 228 (62%) | 95% | 96% | 95% |
| SELECT | 323 | 180 (56%) | 96% | 81% | 88% |
| REORD | 359 | 205 (57%) | 96% | 82% | 89% |
| SYMMETRIC | 276 | 180 (65%) | 98% | 82% | 89% |

5. Candidate Term Pair Filtering

Section 3 describes how to align target language ("foreign") words to source language ("English") words and terms by maximizing an explicit probability distribution and fulfilling the constraint that all target words aligned to a same (occurrence of a) source term should be contiguous. Each candidate term pair identified at S112 consists of a pair of a candidate source term and a sequence of target words that were aligned to it somewhere in the corpus. For each candidate term pair, the number of times it occurred in the corpus is stored. A crude but simple heuristic for filtering candidates (S114) consists of removing all pairs occurring fewer than $\theta_{min}$ (a parameter of the method) times. More sophisticated filtering methods can be envisaged.

Alternatively, if an application calls for a single translation for each source term, the final bilingual lexicon is obtained by considering, for each candidate source term, only the candidate term pair of highest frequency in the training corpus 12.

6. The EM Algorithm

The general EM algorithm was introduced by A. P. Dempster, N. M. Laird, and D. B. Rubin, "Maximum Likelihood from Incomplete Data Using the EM algorithm," Journal of the Royal Statistical Society, Series B (Methodological), 39(1):1-38 (1977). A thorough explanation of the method is provided in "The EM Algorithms and Extensions," John Wiley & Sons, 1997.

For the present embodiment, hidden variables are $Z=\{z_{lpq}\}$, $l=1 \ldots L$, $1 \leq p$, $q \leq J$ such that $z_{la_{j-1}a_j}=1$ if in the transition from state $a_{j-1}$ to state $a_j$ the $l^{th}$ component of the mixture was selected, and $z_{la_{j-1}a_j}=0$ otherwise. Note that here the general case for a mixture with L components is developed:

$$p(M \mid N) = \sum_{l=0}^{L} p(\alpha_l) p_{\alpha_l}(M \mid N)$$

The completed likelihood of the HMM emitting the foreign sentence $f_1^J$ thus becomes:

$$p(f_1^J, Z \mid e_1^I) = \qquad (7)$$

$$\sum_{a_1,\ldots,a_J=1}^{I} \prod_{j=1}^{J} p(f_j \mid e_{a_j}) \sum_{l=1}^{L} a_{la_j a_{j-1}} p(\alpha_l) p_{\alpha_l}(e_{a_j} \mid e_{a_{j-1}})$$

Given some initial estimates of the mixing probabilities, in the E-step the expected number $\gamma_l(M,N)$ of times that, in generating the training sentence, there will be a transition from state $e_M$ to state $e_N$ due to component l is first computed, as follows:

$$\gamma_l(M, N) = \qquad (8)$$

$$\sum_{j=1}^{J} p_{fw}(f_1^{j-1} \mid a_{j-1} = M) p_t(a_j = N, l \mid a_{j-1} = M) p_{bw}(f_j^J \mid a_j = N)$$

where $p_{fw}(f_1^j \mid a_j=M)$ is the probability that the HMM will generate $f_1 \ldots f_j$ assuming that it has to end up in state $e_M$ (forward probability):

$$p_{fw}(f_1^j \mid a_j = M) = \qquad (9)$$

$$\sum_{a_1,\ldots,a_{j-1}=1}^{I} \left( \prod_{j'=1}^{j-1} p(f_{j'} \mid e_{a_{j'}}) p(a_{j'} \mid a_{j'-1}) \right) p(M \mid a_{j-1}) p(f_j \mid e_M)$$

$p_t(a_j=N, l \mid a_{j-1}=M)$ is the probability that, starting in state $e_M$ the HMM will transit in state $e_N$ due to the component l of the mixture:

$$p_t(a_j = N, l \mid a_{j-1} = M) = p(\alpha_l) p_{\alpha_l}(N \mid M) \qquad (10)$$

$p_{bw}(f_j^J \mid a_j=N)$ is the probability that, starting in state $e_N$, the HMM will generate $f_j \ldots f_J$ (backward probability):

$$p_{bw}(f_j^J \mid a_j = N) = p(f_j \mid e_N) \sum_{a_{j+1}=1}^{I} \left( p(f_{j+1} \mid e_{a_{j+1}}) p(a_{j+1} \mid N) \right. \qquad (11)$$

$$\left. \sum_{a_{j+2},\ldots,a_J=1}^{I} \prod_{j'=j+1}^{J} p(f_{j'} \mid e_{a_{j'}}) p(a_{j'} \mid a_{j'-1}) \right)$$

The maximum-likelihood estimates for the conditional probabilities of using a specific mixture component given a transition is then given by:

$$p(\alpha_l \mid M, N) = \frac{\gamma_l(M, N)}{\sum_{l'=0}^{L} \gamma_{l'}(M, N)} \qquad (12)$$

In the M-step new estimates are finally obtained for the mixing probabilities for the sentence under consideration:

$$p(\alpha_l) = \sum_{M,N=1}^{I} \sum_{j=1}^{J} p_{fw}(f_1^j \mid a_j = M) \qquad (13)$$

$$p(\alpha_l \mid M, N) p_{\alpha_l}(N \mid M) p_{bw}(f_{j+1}^J \mid a_j = N)$$

By iterating the E-step and the M-step until convergence (and having conveniently formulated the computation of the forward and backward probabilities recursively so as to minimize complexity through dynamic programming) final estimates are obtained for the mixing probabilities of the transitions for the bi-phrase under consideration.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. An alignment method comprising:
   with a computing device, for a source sentence in a source language, prior to word level alignment of the source sentence with a target sentence in a target language, identifying whether the sentence includes at least one candidate term comprising a contiguous subsequence of words of the source sentence;

aligning the target sentence in the target language with the source sentence, comprising:

developing a probabilistic model which models conditional probability distributions for alignments between words of the source sentence and words of the target sentence; and generating an optimal alignment based on the probabilistic model, including, where the source sentence includes the at least one candidate term, enforcing a contiguity constraint which requires that all the words of the target sentence which are aligned with an identified candidate term form a contiguous subsequence of the target sentence.

2. The alignment method of claim 1, wherein the optimal alignment accepts at least some reordering of the words in the target sentence which are aligned to the words in the source sentence.

3. The alignment method of claim 1, wherein the identifying of the at least one candidate term includes determining whether a contiguous sequence of words meet criteria defining a class of terms.

4. The method of claim 3, wherein terms in the class are identified by matching part-of-speech patterns.

5. The alignment method of claim 1, wherein the at least one candidate term is a noun phrase.

6. The alignment method of claim 1, wherein the probabilistic model is a Hidden Markov Model.

7. The alignment method of claim 6, wherein the Hidden Markov Model models a combination of emission probabilities and transition probabilities, the emission probabilities each being based on the probability that word of the target sentence is a translation of a word of the source sentence with which it is aligned, the transition probabilities each being based on the probability that a word of the target sentence will be aligned with a word of the source sentence given that the previous word of the target sentence is aligned with a specific word of the source sentence.

8. The method of claim 7, wherein in modeling the transition probabilities, the model takes into account whether a word of the target language is being aligned with one of the at least one candidate terms or with a word outside the at least one candidate term.

9. The alignment method of claim 6, when the model favors alignments between words which maintain a monotonic alignment between the source and target sentences.

10. The method of claim 1, wherein the generating of the optimal alignment includes generating a first automaton based on the probabilistic model and applying the first automaton in combination with a second automaton which enforces the contiguity constraint.

11. The method of claim 10, wherein the first and second automata are weighted finite-state transducers.

12. The method of claim 10, wherein the generating of the optimal alignment includes repeating the following steps until an alignment respecting the contiguity constraint is produced:

applying a first automaton to produce an alignment between the target sentence and the source sentence;

determining whether the alignment meets the contiguity constraint, and, where the alignment does not meet the contiguity constraint, identifying which of the at least one candidate terms for which the contiguity constraint is not met; and generating a second automaton to enforce the contiguity constraint for those candidate terms for which the contiguity constraint is not met.

13. The method of claim 1, wherein the generating the optimal alignment includes:

applying a constraint which requires that in the alignment, for each of the identified candidate terms, at least one word of the target sentence is aligned to the candidate term.

14. The method of claim 13, wherein the generating of the optimal alignment includes:

applying a constraint which requires that in the alignment, for each of the identified candidate terms, the number of words of the target sentence aligned to the term at least equals the number of source words in the candidate term.

15. The method of claim 13, further comprising, prior to the aligning of the target sentence with the source sentence, identifying compound words in at least one of the source and target sentences and decomposing the identified compound words.

16. The method of claim 1, wherein the generating of the optimal alignment includes:

applying a constraint which limits reordering to local reordering.

17. The method of claim 1, further comprising outputting the words of the target sentence which are aligned with the at least one candidate term.

18. The method of claim 17, further comprising adding the candidate term and output words of the target sentence to a bilingual terminological lexicon.

19. The method of claim 1, wherein the method operates without identification of terms in the target sentence.

20. A system which includes processing components which are configured for performing the method of claim 1.

21. A computer program product comprising a tangible recording medium on which a control program is recorded, which, when executed on a computer, performs an alignment method comprising:

with a computing device, for a source sentence in a source language, identifying whether the sentence includes at least one candidate term comprising a contiguous subsequence of words of the source sentence, the candidate term matching a selected part-of-speech pattern;

thereafter, aligning a target sentence in a target language with the source sentence, comprising:

developing a probabilistic model which models conditional probability distributions for alignments between words of the source sentence and words of the target sentence; and generating an optimal alignment based on the probabilistic model, including, where the source sentence includes the at least one candidate term, enforcing a contiguity constraint which requires that all the words of the target sentence which are aligned with an identified candidate term form a contiguous subsequence of the target sentence.

22. A system comprising:

a sentence aligner which aligns sentences of a target document in a target language with respective sentences of a source document in a source language;

a source term tagger which tags terms of each source sentence which meet criteria for at least one class of candidate terms, each of the candidate terms comprising a contiguous subsequence of words of the source sentence;

a word aligner which, for a pair of sentences aligned by the sentence aligner and tagged with the source term tagger, generates an alignment between the words of a target sentence and the words of the source sentence, the word aligner using a probabilistic model which models conditional probability distributions for alignments between words of the source sentence and words of the target sentence and generating an optimal alignment based on the probabilistic model, the word aligner enforcing a contiguity constraint which requires that all the words of the target sentence which are aligned with one of the candidate terms identified by the term tagger form a contiguous subsequence of the target sentence.

23. The system of claim 22, further comprising:
a term extractor which extracts contiguous subsequences of the target sentences that are aligned to a common source candidate term; and
a filter which, filters the extracted contiguous subsequences to remove contiguous subsequences which are less probable translations of the common candidate term.

24. A method of generating a terminological lexicon comprising:
providing a parallel corpus, the corpus comprising source sentences in a source language and target sentences in target language;
applying part-of-speech patterns for identifying of noun phrases in the source sentences but not in the target sentences;
thereafter, for each of plurality of source sentences, generating an alignment in which words of a respective target sentence are aligned with words of the source sentence, whereby words of the target sentence which are aligned with an identified noun phrase are identified, wherein in generating the alignment, a contiguity constraint is enforced which requires that all the words of the target sentence which are aligned with the selected noun phrase form a contiguous subsequence of words of the target sentence;
optionally, where a plurality of contiguous subsequences of aligned target sentences are aligned with a common noun phrase, filtering the contiguous subsequences to remove contiguous subsequences which are less probable translations of the noun phrase; and
incorporating the noun phrase together with at least one identified contiguous sequence which has been aligned with the noun phrase in a terminological lexicon.

* * * * *